(12) United States Patent
Tokunaga

(10) Patent No.: US 10,225,455 B2
(45) Date of Patent: Mar. 5, 2019

(54) COMMUNICATION APPARATUS, INFORMATION PROCESSING APPARATUS, METHODS AND COMPUTER-READABLE STORAGE MEDIUM

(71) Applicant: CANON KABUSHIKI KAISHA, Tokyo (JP)

(72) Inventor: Koshi Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/508,428

(22) PCT Filed: Aug. 27, 2015

(86) PCT No.: PCT/JP2015/004316
§ 371 (c)(1),
(2) Date: Mar. 2, 2017

(87) PCT Pub. No.: WO2016/035293
PCT Pub. Date: Mar. 10, 2016

(65) Prior Publication Data
US 2017/0295311 A1    Oct. 12, 2017

(30) Foreign Application Priority Data

Sep. 3, 2014   (JP) .................................. 2014-179522
Aug. 25, 2015  (JP) .................................. 2015-166187

(51) Int. Cl.
*H04N 5/232*       (2006.01)
*H04N 1/00*        (2006.01)

(52) U.S. Cl.
CPC ..... *H04N 5/23206* (2013.01); *H04N 1/00281* (2013.01); *H04N 5/23216* (2013.01);
(Continued)

(58) Field of Classification Search
CPC ........... H04N 5/23206; H04N 1/00281; H04N 5/23245; H04N 5/23241; H04N 5/23216;
(Continued)

(56) References Cited

U.S. PATENT DOCUMENTS

2006/0184535 A1    8/2006   Kaluskar et al.
2007/0025711 A1*   2/2007   Marcus ................. G03B 17/38
                                                      396/56
(Continued)

FOREIGN PATENT DOCUMENTS

EP           1722290 A1      11/2006
JP         2009-237725 A     10/2009
(Continued)

OTHER PUBLICATIONS

Sadayuki Furuhashi, "Comet and the restriction of number of simultaneous connections", Blog by Sadayuki Furuhashi, May 21, 2008 retrieved from internet: http://frsyuki.hatenablog.com/entry/20080521/p2 (Cited in the ISR).
(Continued)

*Primary Examiner* — Shahbaz Nazrul
(74) *Attorney, Agent, or Firm* — Cowan, Liebowitz & Latman, P.C.

(57) ABSTRACT

The present invention is capable of spontaneously providing a status notification to an external device in an appropriate manner. To achieve this aim, the external device, upon establishing communication with a communication apparatus, makes a status notification request to the communication apparatus, the status notification request being a request for a response that, when a change occurs in an internal status of the communication apparatus, indicates the change. Also, upon making a request to serve as a remote camera to the communication apparatus via a user interface, the external device makes a status notification request to the communi-
(Continued)

cation apparatus, regardless of whether or not a response has been made to the first request.

30 Claims, 11 Drawing Sheets

(52) U.S. Cl.
CPC ..... *H04N 5/23241* (2013.01); *H04N 5/23245* (2013.01); *G03B 2206/00* (2013.01); *H04N 5/23293* (2013.01)

(58) Field of Classification Search
CPC ............ H04N 5/23293; G03B 2206/00; G08B 13/1966; G08B 13/19684
See application file for complete search history.

(56) References Cited

U.S. PATENT DOCUMENTS

| | | | |
|---|---|---|---|
| 2009/0228547 A1* | 9/2009 | Miyaoka | H04L 67/1095 709/203 |
| 2012/0239698 A1 | 9/2012 | Ohtake et al. | |
| 2012/0281101 A1 | 11/2012 | Fujinawa et al. | |
| 2014/0045481 A1* | 2/2014 | Fraley | H04W 52/0258 455/418 |
| 2014/0198220 A1 | 7/2014 | Nakamura | |
| 2016/0112649 A1* | 4/2016 | Nowak | G11B 27/031 348/36 |
| 2016/0360160 A1* | 12/2016 | Eizenberg | G06Q 30/0207 |
| 2017/0070659 A1* | 3/2017 | Kievsky | H04N 5/23206 |
| 2017/0187995 A1* | 6/2017 | Scalisi | H04N 7/186 |
| 2017/0201745 A1* | 7/2017 | Abramov | G06K 9/036 |

FOREIGN PATENT DOCUMENTS

| | | |
|---|---|---|
| JP | 2013-073506 A | 4/2013 |
| JP | 2014-158088 A | 8/2014 |
| WO | 2014/103312 A1 | 7/2014 |

OTHER PUBLICATIONS

Syougo Nakahara et al., Development Support Methods Based REST Architecture for M2M, IEICE Technical Report, Jan. 17, 2013, vol. 112, No. 404, pp. 37-41 (Cited in the ISR).
The US Publications, foreign references 1, 3-4 and the NPLs were cited in the International Search Report dated Nov. 17, 2015 of International Application No. PCT/JP2015/004316.
The above documents were cited in a European Search Report dated Mar. 14, 2018, issued in the corresponding European Patent Application No. 15837874.5.

* cited by examiner

[Fig. 1A]
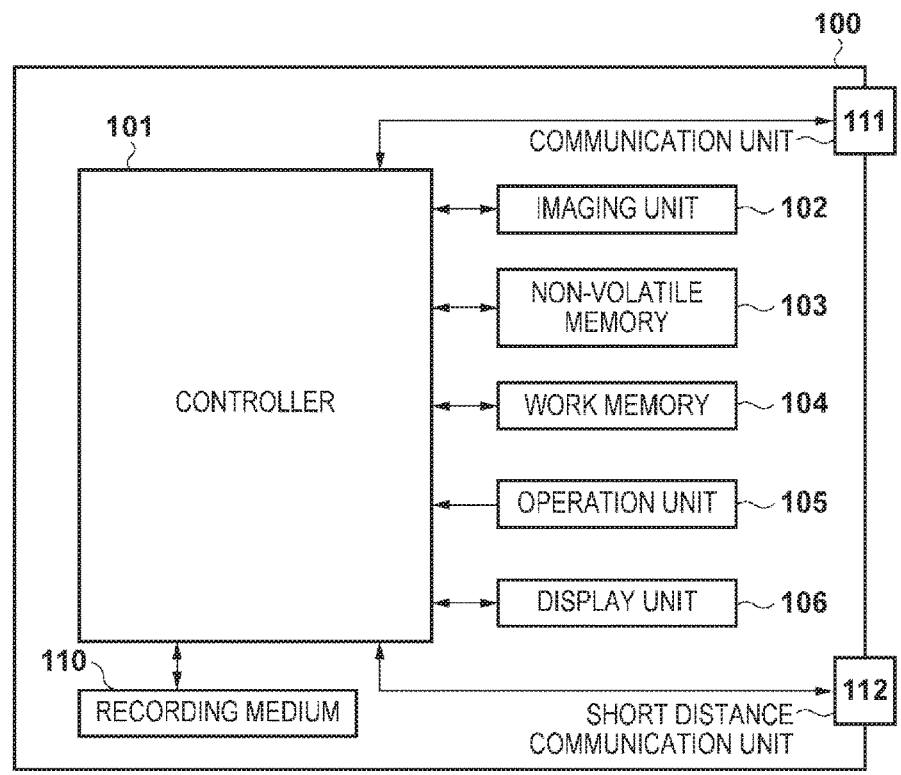
[Fig. 1B]
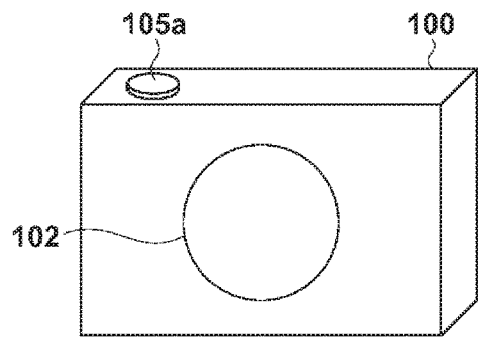
[Fig. 1C]
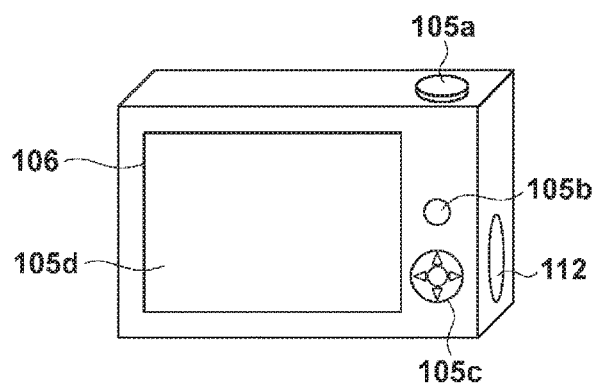

[Fig. 2]
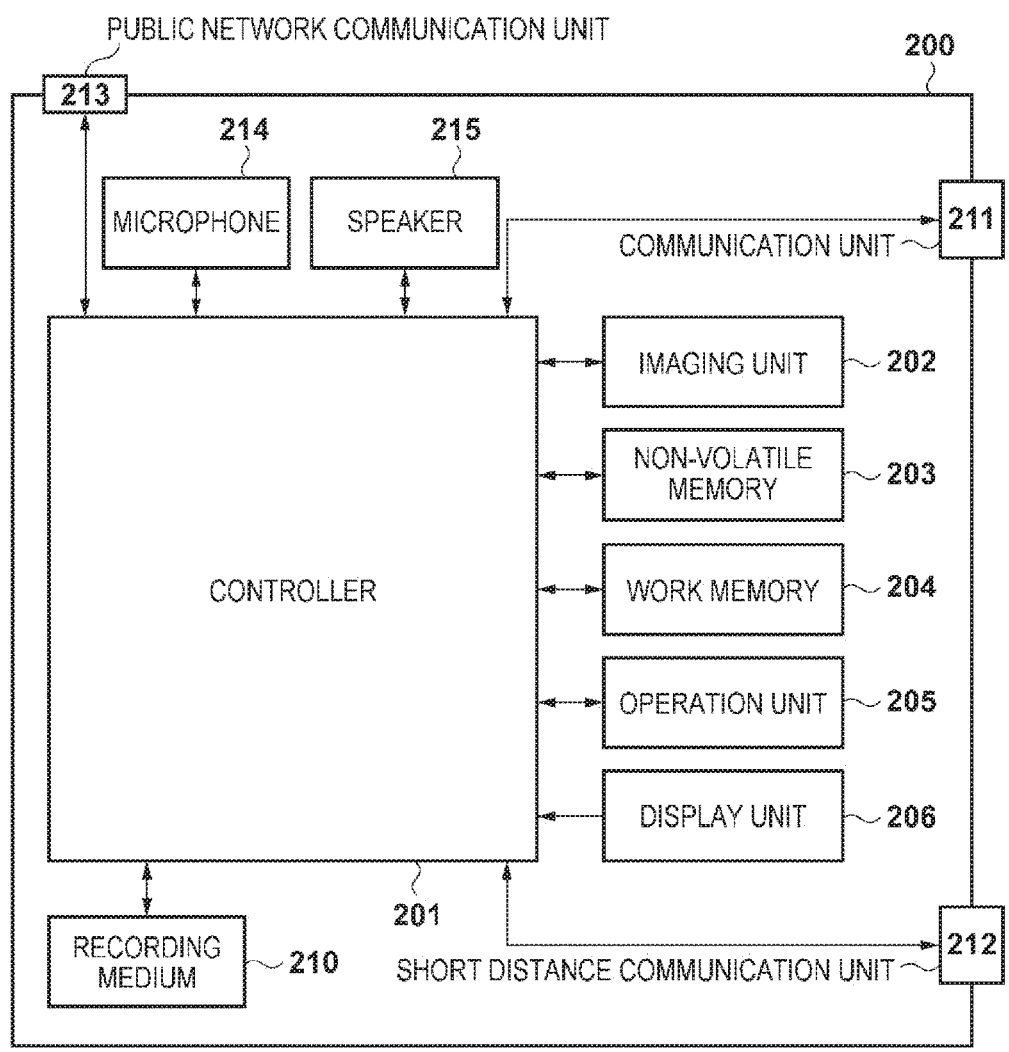

[Fig. 3]

| | API NAME | REQUEST (ARGUMENT) | RESPONSE | DESCRIPTION |
|---|---|---|---|---|
| 301 | Request ProductInfo | NONE | · PRODUCT NAME<br>· MANUFACTURER NAME<br>· FIRMWARE VERSION<br>· SERIAL NUMBER | ACQUIRE PRODUCT INFORMATION OF DIGITAL CAMERA |
| 302 | Request MemoryInfo | NONE | · STORAGE AREA ID<br>· STORAGE CAPACITY<br>· FREE SPACE<br>· STORED CONTENT FILE COUNT | ACQUIRE INFORMATION OF STORAGE AREA OF DIGITAL CAMERA |
| 303 | Request ContentInfo | · STORAGE AREA ID<br>· CONTENT FORMAT TYPE<br>· REQUESTED CONTENT FILE COUNT | · CONTENT ID<br>· CONTENT FILE NAME<br>· CONTENT FILE SIZE<br>· CONTENT FILE GENERATION DATE | ACQUIRE CONTENT ID AND BASIC INFORMATION OF CONTENT FILE STORED IN STORAGE AREA OF DIGITAL CAMERA |
| 304 | RequestContent | · CONTENT ID<br>· CONTENT SIZE | · CONTENT FILE | ACQUIRE CONTENT FILE |
| 305 | StartCapture Mode | NONE | · PROCESSING RESULTS | PREPARE FOR REMOTE IMAGE CAPTURING |
| 306 | RequestCapture Value | NONE | · STATUS INFORMATION<br>· IMAGE CAPTURING SETTING INFORMATION | PREPARE FOR REMOTE IMAGE CAPTURING |
| 307 | RequestThrough Content | · THROUGH-THE-CAMERA IMAGE SIZE | · THROUGH-THE-CAMERA IMAGE DATA | ACQUIRE THROUGH-THE-CAMERA IMAGE |
| 308 | ExecuteCapture | NONE | · CONTENT ID<br>· CONTENT FILE NAME<br>· CONTENT FILE SIZE<br>· CONTENT FILE GENERATION DATE | CAPTURE IMAGE |
| 309 | EndCaptureMode | NONE | · PROCESSING RESULTS | END REMOTE IMAGE CAPTURING |
| 310 | RequestEvent | NONE | · STATUS CHANGE INFORMATION | ACQUIRE STATUS CHANGE OF DIGITAL CAMERA |

[Fig. 4]
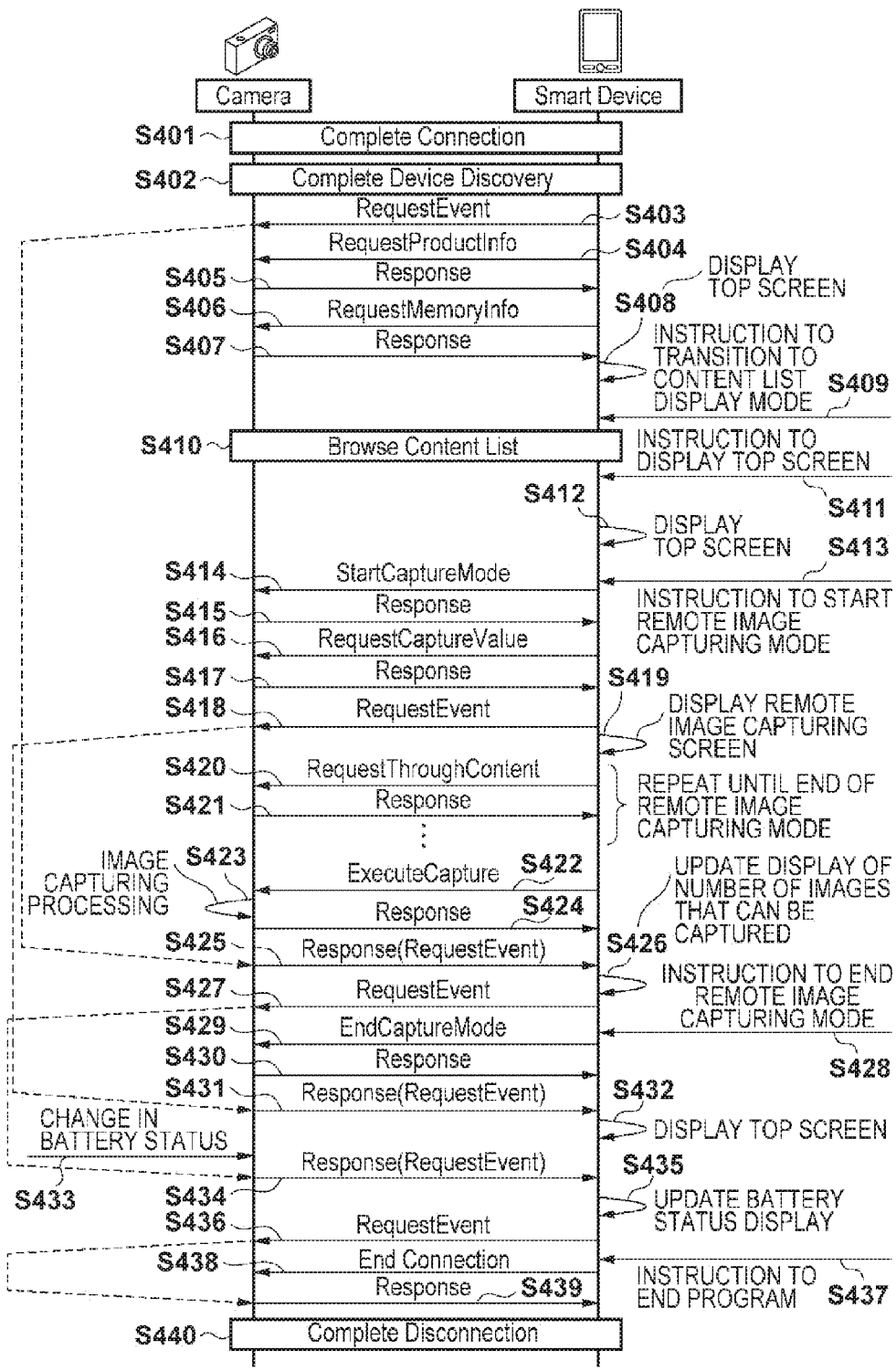

[Fig. 5]
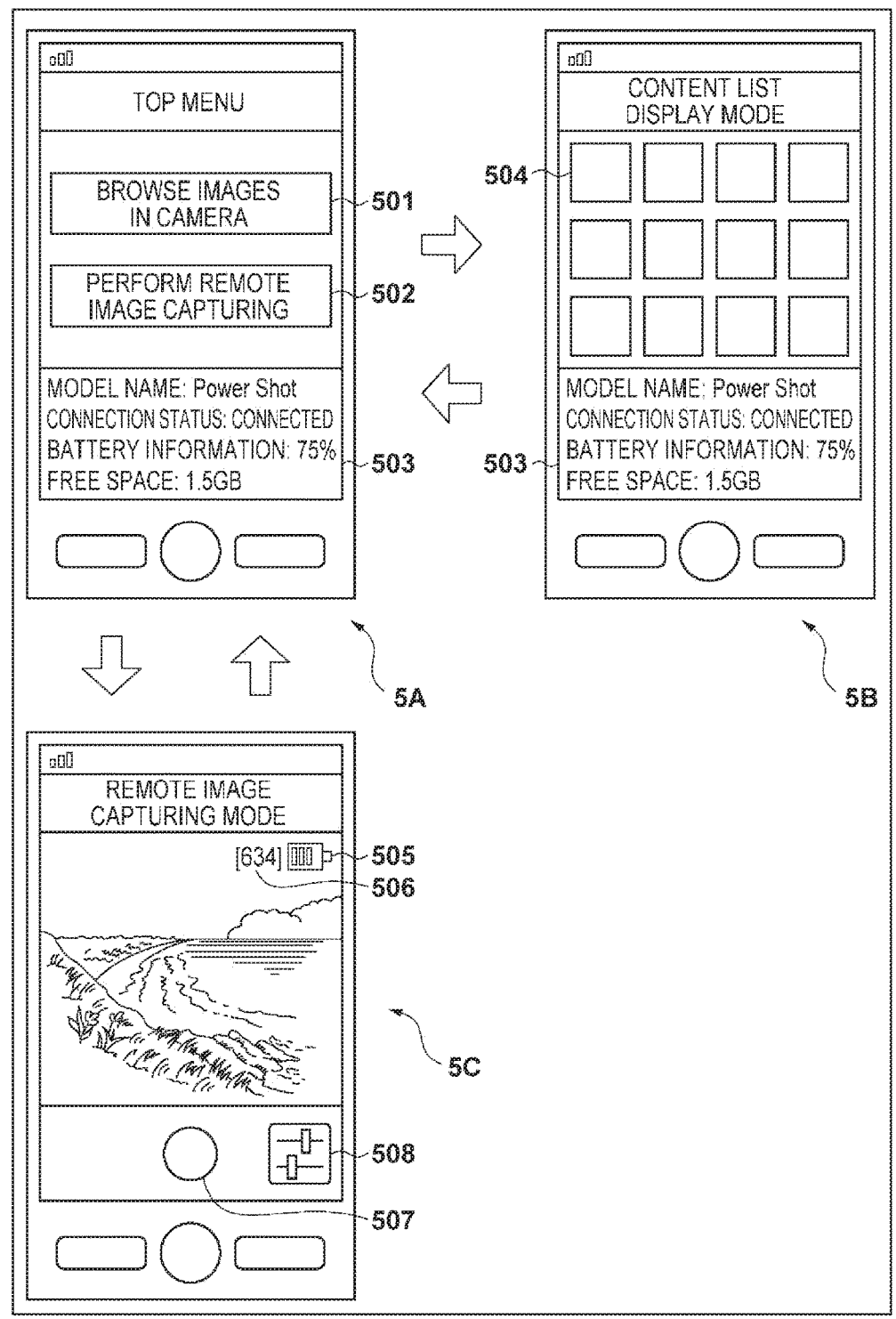

[Fig. 6A]
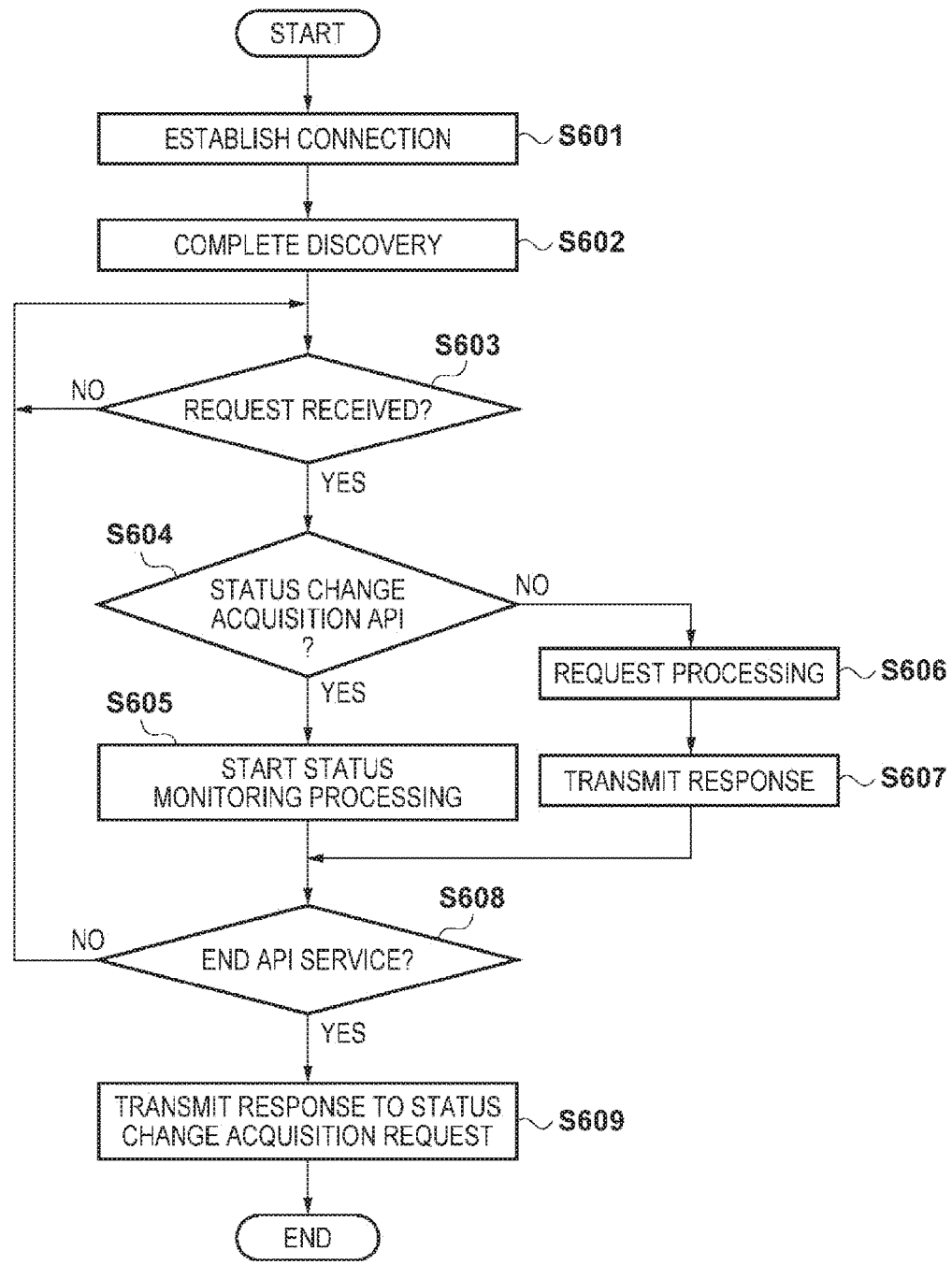

[Fig. 6B]
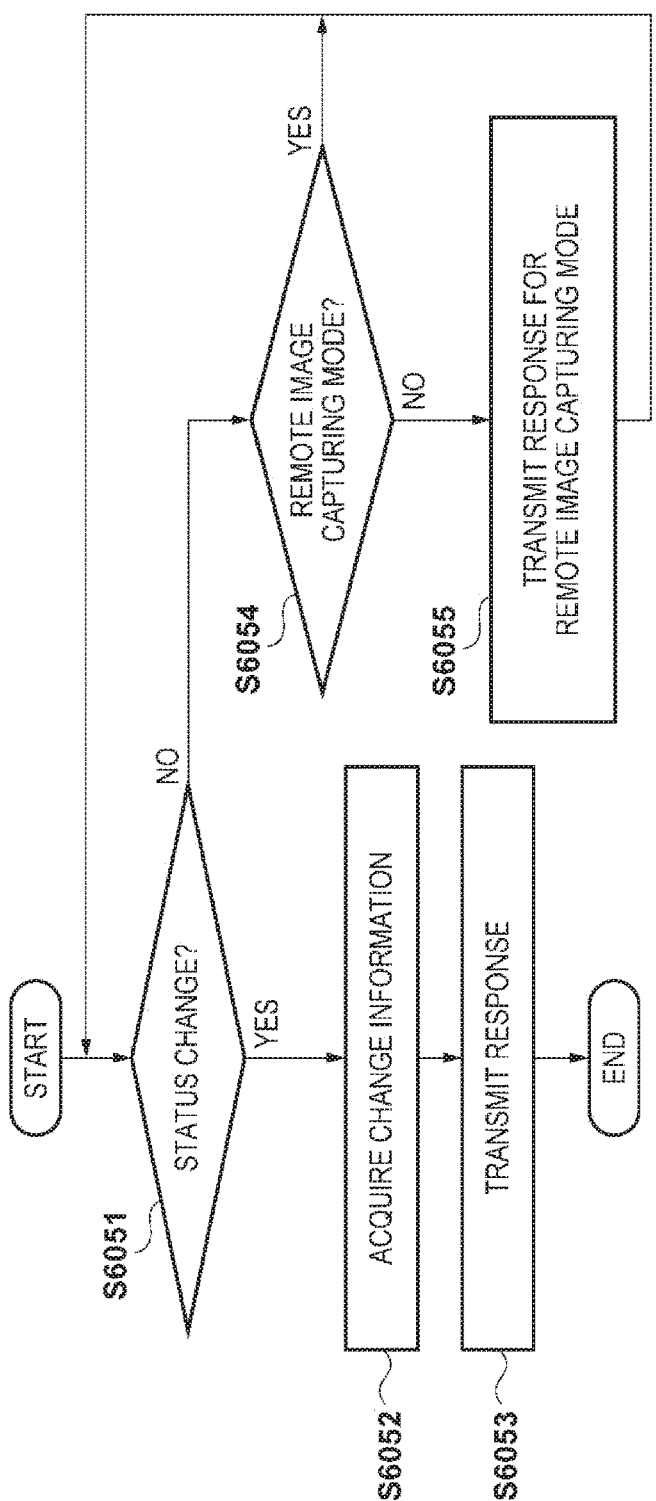

[Fig. 7A]
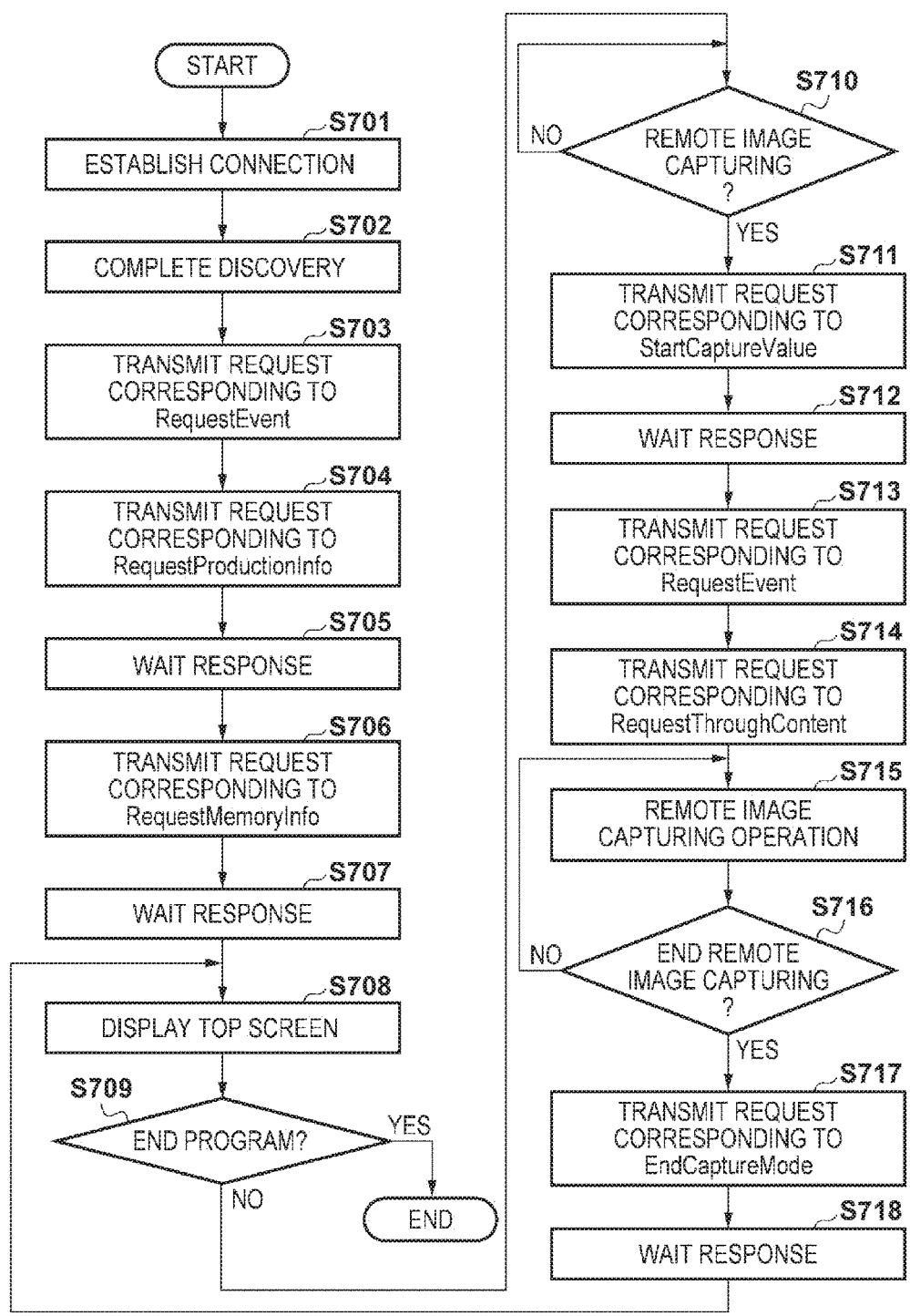

[Fig. 7B]
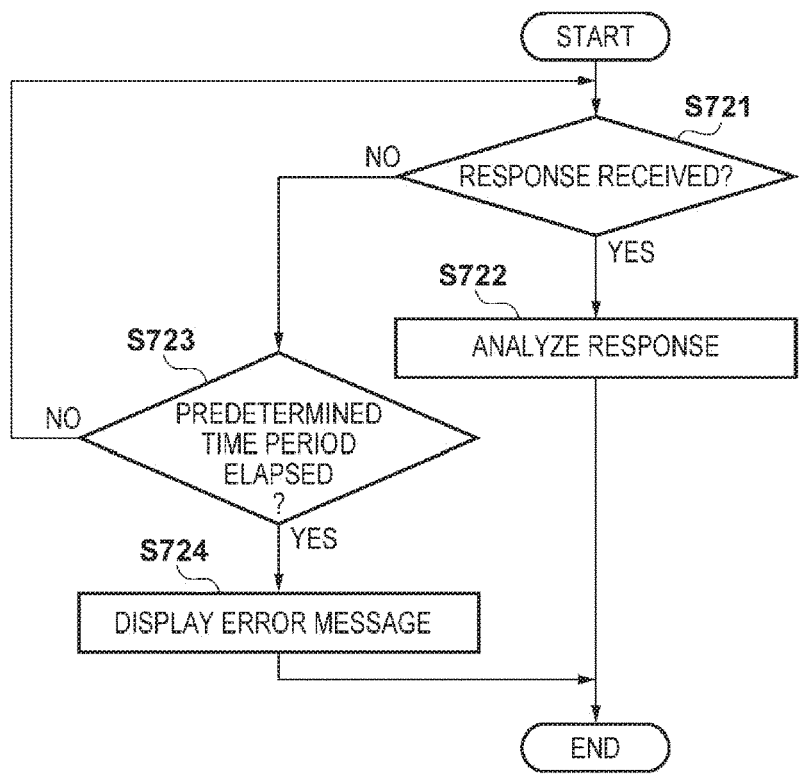
[Fig. 7C]
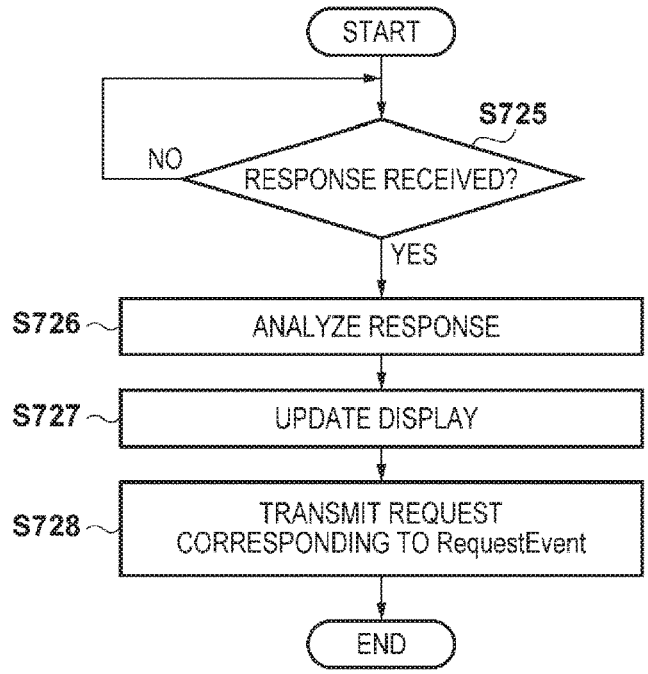

[Fig. 8]

| API NAME | REQUEST (ARGUMENT) | RESPONSE | DESCRIPTION |
|---|---|---|---|
| RequestCameraEvent | NONE | · STATUS CHANGE INFORMATION | ACQUIRE STATUS CHANGE OF DIGITAL CAMERA (COMMON TO ALL MODES) |
| RequestCaptureEvent | NONE | · REMOTE IMAGE CAPTURING SETTING CHANGE INFORMATION | ACQUIRE STATUS CHANGE OF DIGITAL CAMERA (FOR REMOTE IMAGE CAPTURING) |
| ... | | | |

[Fig. 9]
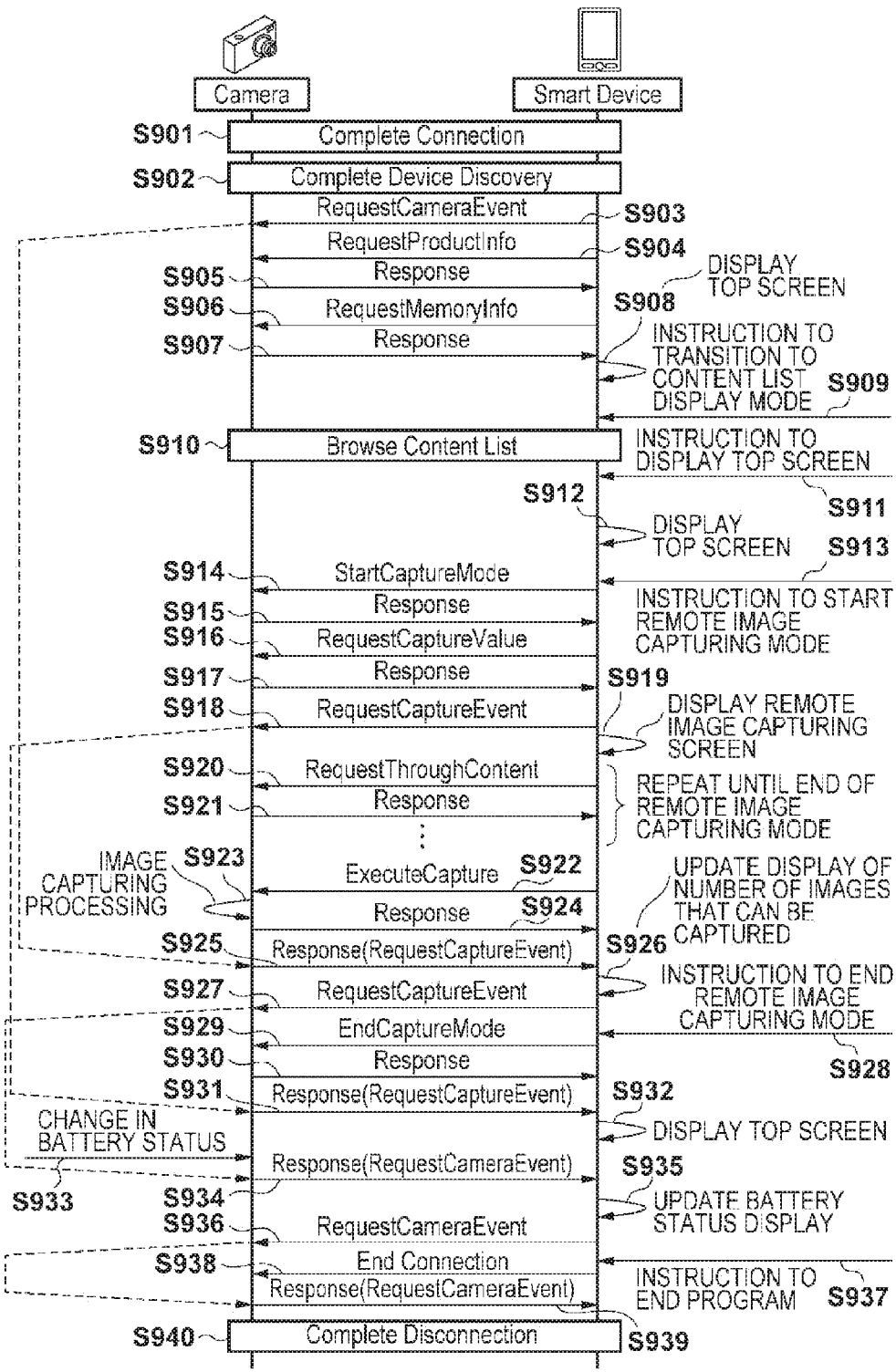

COMMUNICATION APPARATUS, INFORMATION PROCESSING APPARATUS, METHODS AND COMPUTER-READABLE STORAGE MEDIUM

CROSS-REFERENCE TO RELATED APPLICATIONS

This application claims priority to International Application No. PCT/JP2015/004316 filed on Aug. 27, 2015, the entire disclosure of which is hereby incorporated by reference.

TECHNICAL FIELD

The present invention relates to a communication apparatus, an information processing apparatus, methods and a computer-readable storage medium.

BACKGROUND ART

Owing to progress in the development of the communication function of image processing apparatuses (or image capturing apparatuses) such as digital cameras, it has become possible for a digital camera, for example, to communicate with a PC, a mobile phone, etc., and transmit and receive content.

Now it is also possible to achieve remote image capturing by using a server-client system such as an HTTP system, in which a camera serves as a server (e.g., Japanese Patent Laid-open No. 2013-073506).

In a server-client system or the like, it is common that the server is somehow restricted from spontaneously providing a notification to the client. In this regard, it is possible that first the client transmits a request, then the server maintains the response to the request in a suspended state, and the server spontaneously provides a notification to the client at appropriate timing.

However, in particular cases such as the case of remote image capturing, there are various kinds of information to be notified and the timing of notification also varies widely, and therefore it is necessary to conceive of an appropriate notification method.

SUMMARY OF INVENTION

The present invention has been made to solve the problem.

According to a first aspect of the present invention, there is provided a communication apparatus comprising: reception means for receiving a request from an information processing apparatus; transmission means for transmitting a response to the request; and managing means for, when a predetermined request from the information processing apparatus is received, managing the predetermined request as a suspended request, instead of immediately responding to the predetermined request; wherein when a status of the communication apparatus fulfills a predetermined condition, the transmission means transmits status information of the communication apparatus, which serves as a response to the suspended request, and wherein the managing means is configured to manage a plurality of suspended requests.

According to a second aspect of the present invention, there is provided an information processing apparatus comprising: transmission means for transmitting a request to a communication apparatus; and reception means for receiving from the communication apparatus a response to the request; wherein the transmission means transmits a predetermined request to the communication apparatus, wherein a response to the predetermined request is suspended by the communication apparatus and is used for transmitting status information of the communication apparatus from the communication apparatus to the information processing apparatus, and wherein the transmission means is configured to transmit a new predetermined request before reception of a response to a predetermined request that has already been transmitted.

According to a third aspect of the present invention, there is provided a method for controlling a communication apparatus, comprising: a reception step of receiving a request from an information processing apparatus; a transmission step of transmitting a response to the request; and a managing step of, when a predetermined request from the information processing apparatus is received, managing the predetermined request as a suspended request, instead of responding to the predetermined request, wherein, in the transmission step, when a status of the communication apparatus fulfills a predetermined condition, status information of the communication apparatus, which serves as a response to the suspended request, is transmitted, and wherein, in the managing step, a plurality of suspended requests can be managed.

According to a fourth aspect of the present invention, there is provided a method for controlling an information processing apparatus, comprising: a transmission step of transmitting a request to a communication apparatus; and a reception step of receiving from the communication apparatus a response to the request, wherein, in the transmission step, a predetermined request is transmitted to the communication apparatus, wherein a response to the predetermined request is suspended by the communication apparatus and is used for transmitting status information of the communication apparatus from the communication apparatus to the information processing apparatus, and wherein, in the transmission step, a new predetermined request can be transmitted before reception of a response to a predetermined request that has already been transmitted.

The apparatus according to the present invention is capable of spontaneously providing a status notification to an external device in an appropriate manner.

Further features of the present invention will become apparent from the following description of exemplary embodiments (with reference to the attached drawings).

BRIEF DESCRIPTION OF DRAWINGS

FIG. 1A is a block configuration of a digital camera according to an embodiment.

FIG. 1B is a diagram showing a front side of the digital camera.

FIG. 1C is a diagram showing a rear side of the digital camera.

FIG. 2 is a block diagram showing a configuration of a smart device according to an embodiment.

FIG. 3 is a diagram showing a list of APIs provided for a digital camera according to an embodiment.

FIG. 4 is a diagram showing an example of a communication sequence between a digital camera and a smart device according to a first embodiment.

FIG. 5 is a diagram showing the transition of a user interface screen of a smart device according to an embodiment.

FIG. 6A is a flowchart showing processing procedures performed by a digital camera according to an embodiment.

FIG. 6B is a flowchart showing processing procedures performed by a digital camera according to an embodiment.

FIG. 7A is a flowchart showing processing procedures performed by a smart device according to an embodiment.

FIG. 7B is a flowchart showing processing procedures performed by a smart device according to an embodiment.

FIG. 7C is a flowchart showing processing procedures performed by a smart device according to an embodiment.

FIG. 8 is a diagram showing APIs for making a status notification request according to a second embodiment.

FIG. 9 is a diagram showing an example of a communication sequence between a digital camera and a smart device according to a second embodiment.

DESCRIPTION OF EMBODIMENTS

The following provides detailed descriptions of embodiments of the present invention, with reference to the accompanying drawings. Note that the embodiments described below are merely examples of the means for implementing the present invention, and may be modified or altered depending on the configuration of the apparatus to which the present invention is applied, and on various conditions. Also, the embodiments may be combined with each other as needed.

First Embodiment

Configuration of Digital Camera 100

FIG. 1A is a block diagram showing an example of the configuration of a digital camera 100 an example of a communication apparatus according to the present embodiment. Note that although a digital camera is described below as an example of the communication apparatus, the communication apparatus is not limited to a digital camera. For example, the communication apparatus may be an information processing apparatus such as a portable media player, a so-called tablet device, or a personal computer.

A controller 101 controls each component of the digital camera 100 according to input signals and programs described below. Note that instead of the controller 101 controlling the entire apparatus, a plurality of pieces of hardware may control the entire apparatus by sharing the processing.

An imaging unit 102 includes, for example, an optical lens unit, an optical system for controlling the aperture, zooming, focusing, etc., and an imaging device for converting the light (images) introduced via the optical lens unit, into electrical image signals. As the imaging device, a CMOS (Complementary Metal Oxide Semiconductor) or a CCD (Charge Coupled Device) is typically used. Under the control of the controller 101, the imaging unit 102 converts the light from the subject whose image is formed by a lens included in the imaging unit 102 into an electrical signal, performs noise reduction processing and the like, and outputs image data, which is digital data. The controller 101 of the digital camera 100 according to the present embodiment encodes the image data, and records it in the form of a file on a recording medium 110 according to the DCF (Design Rule for Camera File system) standard.

A non-volatile memory 103 is an electrically erasable and recordable non-volatile memory, and stores, for example, programs described below, which are to be executed by the controller 101. A work memory 104 is used as a buffer memory for temporarily holding the image data captured by the imaging unit 102, an image display memory for a display unit 106, a work area for the controller 101, and so on.

An operation unit 105 is used for receiving a user instruction to the digital camera 100 from the user. The operation unit 105 includes, for example, a power button for making an instruction to turn ON/OFF the digital camera 100, a release switch for making an instruction to perform image capturing, and a playback button for making an instruction to play back image data, which are operated by the user. The operation unit 105 also includes operation members such as a connection button dedicated to start communication with an external device via a communication unit 111 described below. A touch panel formed on the display unit 106 described below is also included in the operation unit 105. Note that the release switch includes two switches SW1 and SW2 for detecting the pressed state of the release switch at two levels. SW1 is turned ON when the release switch is brought into a so-called half-pressed state. As a result, the release switch receives an instruction to prepare processing for image capturing, such as autofocus (AF) processing, auto exposure (AE) processing, auto white balance (AWB) processing, and pre-flash emission (EF) processing. SW2 is turned ON when the release switch is brought into a so-called fully-pressed state. As a result, the release switch receives an instruction to perform image capturing.

The display unit 106 displays view finder images for image capturing, captured image data, characters used for interactive operations, and so on. Note that the display unit 106 is not necessarily built into the digital camera 100. The digital camera 100 is only required to be connectable to an internal or external display unit 106, and to have at least a display control function for controlling display by the display unit 106. Note that the operation unit 105 and the display unit 106 constitute a user interface for the digital camera 100.

The recording medium 110 can record files of image data output from the imaging unit 102. The recording medium 110 may be configured to be detachable from the digital camera 100, or built into the digital camera 100. In other words, the digital camera 100 is only required to have at least a means for accessing the recording medium 110.

The communication unit 111 is an interface for connecting to an external device. The digital camera 100 according to the present embodiment can exchange data with an external device via the communication unit 111. For example, the digital camera 100 can transmit the image data generated by the imaging unit 102 to an external device via the communication unit 111. Note that in the present embodiment, the communication unit 111 includes an interface for performing communication with an external device via a so-called wireless LAN complying with the IEEE 802.11 standard. The controller 101 achieves wireless communication with an external device by controlling the communication unit 111. Note that the communication method is not limited to a wireless LAN communication method, and its examples may include wireless communication methods such as an infrared communication method, a Bluetooth™ communication method, and Wireless USB. Furthermore, a wired connection such as a USB cable, HDMI™, IEEE 1394, or Ethernet™ may be adopted. The communication unit 111 is an example of the first wireless communication means.

A short distance communication unit 112 includes, for example, an antenna for wireless communication, and a modulation/demodulation circuit and communication controller for processing wireless signals. The short distance communication unit 112 achieves short distance communication complying with the ISO/IEC 18092 standard (so-called NFC: Near Field Communication) by outputting modulated wireless signals from the antenna, or demodulating wireless signals received from the antenna. The short distance communication unit 112 also achieves short distance communication according to a wireless communication method such as an infrared communication method, the Bluetooth™ communication method, or the wireless USB. The short distance communication unit 112 according to the present embodiment is provided on a side part of the digital camera 100, and it is an example of the second wireless communication means.

In the present embodiment, the digital camera 100 is connected with a smart device 200 described below, by initiating communication via the communication unit 111. In addition, the communication unit 111 of the digital camera 100 according to the present embodiment has an AP mode for operating as an access point in the infrastructure mode, and a CL mode for operating as a client in the infrastructure mode. Also, by causing the communication unit 111 to operate in the CL mode, the digital camera 100 according to the present embodiment can operate as a CL device in the infrastructure mode. When operating as a CL device, the digital camera 100 can connect to a nearby AP device and thereby join the network formed by the AP device. Also, by causing the communication unit 111 to operate in the AP mode, the digital camera 100 according to the present embodiment can operate as a simplified AP having limited functions (hereinafter, "simplified AP"), which is a sort of AP. When the digital camera 100 operates as a simplified AP, the digital camera 100 forms a network by itself. Devices around the digital camera 100 recognize the digital camera 100 as an AP device, so that they can join the network formed by the digital camera 100. As described above, the programs for causing the digital camera 100 to operate are held in the non-volatile memory 103, and the user selects either the AP mode or the CL mode by operating the operation unit 105.

Note that although the digital camera 100 according to the present embodiment is a sort of AP, it is a simplified AP not having the gateway function for transmitting data received from a CL device to an internet provider or the like. Therefore, even when receiving data from another device that has joined the network formed by the digital camera 100 itself, the digital camera 100 cannot transfer the data to another network such as the Internet.

Next, a description is given of an external appearance of the digital camera 100. FIG. 1B and FIG. 1C show examples of the appearance of the front side and the rear side of the digital camera 100. A release switch 105a, a playback button 105b, a direction key 105c, and a touch panel 105d are operation members included in the operation unit 105. The display unit 106 displays images obtained as the result of image capturing performed by the imaging unit 102, and various sorts of menus. This concludes the configuration of the digital camera 100 according to the embodiment.

Internal Configuration of Smart Device 200

FIG. 2 is a block diagram showing an example of the configuration of a smart device 200 as an example of the information processing apparatus that communicates with the digital camera 100 according to the present embodiment. Note that a smart device is a portable terminal such as a smartphone or a tablet device. Also note that a smart device is described below as an example of the information processing apparatus, but the information processing apparatus is not limited to a smart device. For example, the information processing apparatus may be a digital camera, a printer, a television, or a personal computer, provided with the wireless function.

A controller 201 controls each component of the smart device 200 according to input signals and programs described below. Note that instead of the controller 201 controlling the entire apparatus, a plurality of pieces of hardware may control the entire apparatus by sharing the processing.

An imaging unit 202 converts the light from the subject whose image is formed by a lens included in the imaging unit 202 into an electrical signal, performs noise reduction processing and the like, and outputs image data, which is digital data. The image data thus captured is stored in the buffer memory, is subjected to predetermined operations or encode processing performed by the controller 201, and is then recorded in the form of a file on a recording medium 210.

A non-volatile memory 203 is an electrically erasable and recordable non-volatile memory. In the non-volatile memory 203, an operating system (OS), which is basic software to be executed by the controller 201, and an application program for achieving applied functions by cooperating with the OS are recorded. Also, in the present embodiment, the non-volatile memory 203 stores an application program (hereinafter, "app") for communicating with the digital camera 100.

A work memory 204 is used as an image display memory for a display unit 206, a work area for the controller 201, and so on. An operation unit 205 is used for receiving an instruction to the smart device 200 from the user. The operation unit 205 includes, for example, a power button operated by the user to make an instruction to turn ON/OFF the smart device 200, and operation members such as a touch panel formed on the display unit 206. The display unit 206 displays image data, characters used for interactive operations, and so on. Note that the display unit 206 is not necessarily provided in the smart device 200. The smart device 200 is only required to be connectable to the display unit 206, and to have at least a display control function for controlling display by the display unit 206. Note that the operation unit 205 and the display unit 206 constitute a user interface for the smart device 200.

The recording medium 210 can record image data output from the imaging unit 202. The recording medium 210 may be configured to be detachable from the smart device 200, or built into the smart device 200. In other words, the smart device 200 is only required to have at least a means for accessing the recording medium 210.

A communication unit 211 is an interface for connecting to an external device. The smart device 200 according to the present embodiment can exchange data with the digital camera 100 via the communication unit 211. In the present embodiment, the communication unit 211 is an antenna, and the controller 201 can connect to the digital camera 100 via the antenna. Note that the communication unit 211 may connect directly to the digital camera 100, or via an access point. One example of the protocol for data communication is the HTTP (Hyper Text Transfer Protocol). Alternatively, PTP/IP (Picture Transfer Protocol over Internet Protocol) via a wireless LAN may be used. Note that communication with the digital camera 100 is not limited in this way. For example, the communication unit 211 may include a wireless communication module such as an infrared communication module, a Bluetooth™ communication module, or a Wireless USB. Furthermore, a wired connection such as a USB cable, HDMI™, IEEE 1394, or Ethernet™ may be adopted.

A short distance communication unit 212 is a communication unit for achieving non-contact short distance communication with another device. The short distance communication unit 212 includes, for example, an antenna for wireless communication, and a modulation/demodulation circuit and communication controller for processing wireless signals. The short distance communication unit 212 achieves non-contact short distance communication by outputting modulated wireless signals from the antenna or demodulating wireless signals received from the antenna. Non-contact wireless communication achieved here complies with the ISO/IEC 18092 standard (so-called NFC). Upon receiving a data readout request from another device, the short distance communication unit 212 outputs response data based on the data stored in the non-volatile memory 203.

A public network communication unit 213 is an interface used when performing public wireless communication. The smart device 200 can perform audio communication with another device via the public network communication unit 213. To achieve audio communication, the controller 201 performs audio signal input and output via a microphone 214 and a speaker 215. In the present embodiment, the public network communication unit 213 is an antenna, and the controller 201 can connect to the public network via the antenna. Note that a single antenna may serve as both the communication unit 211 and the public network communication unit 213. This concludes the description of the smart device 200 according to the embodiment.

Configuration of APIs for Controlling Digital Camera from External Device

FIG. 3 is a diagram showing APIs (Application Programming Interfaces) for controlling the digital camera 100 from an external device. These APIs are used when the digital camera 100 according to the embodiment is caused to operate in the AP mode described above.

Regarding the digital camera 100 according to the present embodiment, it is assumed that APIs for controlling the digital camera 100 from an external device such as the smart device 200 are open to the public. The designer of the external device can enable the external device to control the operations of the digital camera 100 and acquire device information, content data files, etc., from the digital camera 100 by implementing a mechanism for transmitting a request to the digital camera 100, using the public APIs. Through these APIs, the digital camera 100 according to the embodiment provides the external device with the device information recorded on the non-volatile memory 103 of the digital camera 100, content files stored in the recording medium 110 of the digital camera 100, etc. Note that the content files are files generated by the digital camera 100 and stored in the recording medium 110 and the non-volatile memory 103, and include files of captured still images and moving images.

These APIs are stored in the non-volatile memory 103 in advance. Upon establishing communication with an external device via the communication unit 111, the controller 101 loads the program for executing the APIs to the work memory 104, and waits for an API request from the external device. Upon detecting an API request from the external device, the controller 101 executes processing depending on the API type, and returns the result to the external device as a response. Note that the APIs are executed on the communication protocol specified by the digital camera 100, and the external device communicates with the digital camera 100 by using the specified communication protocol, and makes an API request. Note that in the present embodiment, it is assumed that the APIs are executed on the HTTP (Hyper Text Transfer Protocol). In other words, the digital camera 100 serves as an HTTP server. Note that the communication protocol is not limited to the HTTP, and may be another protocol. Since the HTTP protocol itself is a common protocol, it will not be described here. The APIs are executed on the HTTP in the following manner: using the GET method or the POST method, the external device transmits, to the digital camera 100, an API request whose HTTP request body contains the API name and the necessary arguments written in text; and the digital camera 100 adds the result to the HTTP response body and returns the response to the external device.

An API list 300 in FIG. 3 is a table showing a set of APIs operating according to the above-described mechanism and provided by the digital camera 100 according to the embodiment. The following provides a description of each API.

An API 301 is an API for acquiring the product information of the digital camera 100. When receiving a request having the API name "RequestProductInfo" with no argument, the digital camera 100 composes a response from the product name, manufacturer name, firmware version, and serial number of the digital camera 100, stored in the non-volatile memory 103. The digital camera 100 then transmits the information thus composed to the external device, which is the requestor. Note that the product name is the name of the digital camera 100. The manufacturer name is the name of the maker of the digital camera 100. The firmware version is the version number of the program used for controlling the digital camera 100 and is stored in the non-volatile memory 103. The serial number is a unique number that can identify the digital camera 100.

An API 302 is an API for acquiring information about the storage area of the digital camera 100. When receiving a request having the API name "RequestMemoryInfo" with no argument, the digital camera 100 composes a response from the storage area ID, storage capacity, free space, and stored content file count of the digital camera 100. The digital camera 100 then transmits the response thus composed to the external device, which is the requestor. When there are a plurality of storage areas, for example when a plurality of memory cards are attached, the above-described items are transmitted with respect to each storage area. Note that the storage area ID is the ID (Identification) assigned to each of the areas in which content files generated by the digital camera 100 can be stored. For example, it is assigned to the recording medium 110 of the digital camera 100. The storage capacity is the maximum size of the storage area in which the content files can be stored. The free space is the size of the area in which no content file is stored, within the storage area. The stored content file count is the total number of content files stored in the storage area.

An API 303 is an API for acquiring the content ID and basic information of a content file stored in the storage area of the digital camera 100. When receiving the storage area ID acquired by the API 302, a content format type, and a requested content file count as arguments together with a request having the API name "RequestContentInfo", the digital camera 100 acquires the content ID, file name, file size, and file generation date of each content file stored in the storage area of the digital camera 100, and transmits them to the external device, which is the requestor. Note that the content ID is the ID assigned to content files for individual identification. Also note that this API according to the present embodiment sets the upper limit on the number of content files that can be acquired at a time, depending on the size of the work memory 104. Therefore, when the number of the content files stored in the recording medium 110 and so on is greater than the upper limit of this API, it is necessary to repeatedly make the API request.

An API 304 is an API for acquiring a content file stored in the storage area of the digital camera 100. When receiving a content ID and a content size as arguments together with a request having the AIP name "RequestContent", the digital camera 100 transmits the corresponding content file to the external device, which is the requestor. Note that the content size allows for selecting whether to acquire the content file in its original size or in a reduced size. The digital camera 100 generates the content file according to the specified size, and transmits it to the external device as a response. In the present embodiment, it is possible to specify whether to acquire a still image file in its original size or in a thumbnail size. Therefore, the size may be specified by using a character string for distinguishing between the original size and the thumbnail size, instead of using a numeric value.

An API 305 is an API for causing the digital camera 100 to transition to a remote image capturing mode, in which the digital camera 100 performs image capturing under the remote control of the smart device 200. When receiving a request having the API name "StartCaptureMode" with no argument, the digital camera 100 is caused to transition to the state in which the digital camera 100 can perform image capturing, and the digital camera 100 transmits a response indicating whether the mode transition has succeeded or failed, to the external device, which is the requestor.

An API 306 is an API for acquiring information about the status and image capturing setting values of the digital camera 100. When receiving a request having the API name "RequestCaptureValue" with no argument, the digital camera 100 transmits, as a response, the battery status, number of images that can be captured, zooming position, image capturing parameters (Av value, Tv value, ISO value, etc.) of the digital camera 100 to the external device, which is the requestor. Note that the information to be transmitted described above is merely an example, and various sorts of information about the digital camera 100 may be transmitted as needed.

An API 307 is an API for acquiring a through-the-lens image to be displayed on the display unit 106 during image capturing. When receiving a through-the-lens image size specified as an argument together with a request having the API name "RequestThroughContent", the digital camera 100 acquires a through-the-lens image and transmits it to the external device, which is the requestor. The through-the-lens image size can be used for specifying the size in which the through-the-lens image data is to be acquired, and the digital camera 100 generates the through-the-lens image data according to the specified size, and transmits it to the external device as a response.

An API 308 is an API for performing image capturing. When receiving a request having the API name "ExecuteCapture" with no argument, the digital camera 100 controls the imaging unit 102 to perform image capturing processing. After this image capturing is completed and an image file is stored in the recording medium 110, the digital camera 100 transmits, as a response, the content ID, content file name, content file size, and content file generation date generated by image capturing, to the external device, which is the requestor. Accordingly, by using the API "RequestContent" with the received content ID, the requestor can acquire the image resulting from making the image capturing request to the digital camera 100.

An API 309 is an API for causing the digital camera 100 to end the remote image capturing mode in which the digital camera 100 performs image capturing under the remote control of the smart device 200. When receiving a request having the API name "EndCaptureMode" with no argument, the digital camera 100 ends the remote image capturing mode, and transmits a response indicating whether the mode transition has succeeded or failed, to the external device, which is the requestor.

An API 310 is an API for making a status notification request for, when the status of the digital camera 100 changes, acquiring information about the change of the status. When receiving a request having the API name "RequestEvent" with no argument, the digital camera 100 acquires part or all of the information that can be acquired by the API 306, and transmits it to the external device, which is the requestor. However, the digital camera 100 according to the embodiment does not immediately respond to the request corresponding to the API 310. The digital camera 100 waits until the status of the digital camera 100 changes in part, and upon detecting a change, the digital camera 100 transmits, as a response, only the piece of information that has been changed, to the external device, which is the requestor.

This concludes the description of the APIs according to the embodiment. Note that the above-described APIs are merely examples of primary APIs, and other APIs for controlling the digital camera 100 may be provided. Also note that it is assumed that when transmitting a response to any of the above-described API requests, the digital camera 100 specifies the request and returns the corresponding return value (if any) to the requestor. The response is to be defined in the following format: "Response(API request name, return value)". For example, when the digital camera 100 receives a request having the API name "RequestProductInfo" and responds to the request, the response to the requestor will be: "Response(RequestProductInfo, return value)". However, each response suffices if it can notify the requestor as to which API the response corresponds to, and the invention is not limited by the above-described examples.

Communication Sequence in which Smart Device Acquires Status Information of Digital Camera In the embodiment, the smart device 200 and the digital camera 100 connected via a network (a wireless LAN in the embodiment) constitute an image processing system. With reference to FIG. 4 and FIG. 5, the following describes the procedures through which the smart device 200 in the image processing system displays the content list and performs remote image capturing and acquires content files, and also describes the method by which the smart device 200 acquires the status information of the digital camera 100.

In the following, it is assumed that the controller 101 of the digital camera 100 has been caused to transition to the simplified AP mode (in the initial status, the file server mode using the HTTP protocol) according to an instruction from the operation unit 105.

FIG. 4 shows an example of a communication sequence between the smart device 200 and the digital camera 100. Specifically, it is a processing sequence through which the smart device 200 acquires content files stored in the recording medium 110 of the digital camera 100, displays a list of the content files on the display unit 206 of the smart device 200, and then transitions to the remote image capturing mode, and performs remote image capturing. FIG. 5 is a diagram showing a user interface (UI) displayed on the display unit 206 by a program running on the smart device 200.

In the following description, it is assumed that the content files according to the present embodiment are image files, for example. Also, in the following description, when "the smart device 200 transmits a request having the API name "RequestProductInfo" denoted as the API 301 to the digital camera 100" for example, this operation is expressed as follows, for the sake of simplification: "the smart device 200 makes a request corresponding to the RequestProductInfo 301 to the digital camera 100".

First, in step S401, the digital camera 100 and the smart device 200 establish a wireless local area network (LAN) connection. Here, a description is given of the case where the digital camera 100 starts up a simplified AP and establishes the connection according to a user instruction.

The controller 101 of the digital camera 100 generates an SSID (Service Set Identifier) and an encryption key, which are necessary for wireless LAN connection, and then starts up the simplified AP by using the SSID and the encryption key and generates a wireless LAN by using the communication unit 111. At this stage, the digital camera 100 displays, on the display unit 106, information necessary for connecting to the simplified AP provided by the digital camera 100, such as the SSID and the encryption key. Note that the SSID is the identifier of an access point for a wireless LAN according to the IEEE 802.11 series, and is a name provided in order to prevent interference. The encryption key is a key used for encrypting the wireless LAN so as to prevent unauthorized access to the SSID. Next, the controller 101 starts up the DHCP (Dynamic Host Configuration Protocol) server and prepares for assigning IP addresses to the devices that have joined the network generated by the simplified AP.

Meanwhile, the controller 201 of the smart device 200 starts processing for connecting to the wireless LAN via the communication unit 211 according to a user instruction, and performs processing for searching for nearby APs, and displays, on the display unit 206, a list of the SSIDs obtained as a result of the search. By operating the operation unit 205, the user selects, from the list of the SSIDs displayed on the display unit 206, the SSID that matches the SSID of the simplified AP displayed on the display unit 106 of the digital camera 100, and inputs the encryption key. As a result, the controller 201 of the smart device 200 joins the simplified AP network generated by the digital camera 100. Note that the smart device 200 may store the SSIDs and encryption keys of the networks that the smart device 200 has connected to in the past, and when the SSID selected by the user is included in the stored SSIDs, the smart device 200 may display in the encryption key input field, the encryption key stored in correspondence with the SSID as a default value, so as to allow the user to select the encryption key by simply pressing (or touching) the OK button. As a result of the above, an IP address is assigned to the smart device 200 by the digital camera 100, and the smart device 200 completes connection to the wireless LAN. In the example described above, the digital camera 100 also serves as a DHCP server. However, it is possible that the digital camera 100 and the smart device 200 individually connect to a local network established by a router.

Next, in step S402, the smart device 200 performs discovery processing. Then, the digital camera 100 and the smart device 200 recognize each other's presence and services provided. Also, the smart device 200 prepares for starting communication using the APIs provided by the digital camera 100 via the wireless LAN. Note that examples of the protocol used in the discovery processing include the SSDP (Single Service Discovery Protocol) and the Multicast DNS. Since the SSDP and the Multicast DNS are well-known protocols, they will not be described here.

One example of the discovery processing is as follows. The controller 101 of the digital camera 100 transmits an advertise notification to the network generated by the digital camera 100 itself, thereby notifying the smart device 200 of the presence of the digital camera 100 itself. Upon receiving the advertise notification from the digital camera 100, the controller 201 of the smart device 200 acquires a device description, in which the device information of the digital camera 100 is described, from the digital camera 100, and determines whether or not the digital camera 100 provides API services. When determining that the digital camera 100 provides API services, the controller 201 loads from the non-volatile memory 203 to the work memory 204, the program for acquiring image files from the digital camera 100 by using APIs, and executes the program.

Next, in step S403, the controller 201 makes a request corresponding to the RequestEvent 310 to the digital camera 100 via the communication unit 211. When the controller 101 receives a request corresponding to the RequestEvent 310 for the first time since the digital camera 100 started communicating with the smart device 200, the controller 101 stores, to the work memory 104, the initial value 1 of a no-response count, which indicates the number of times a response is not made to the request. Then, when a change is made to the status of the digital camera 100, the controller 101 starts processing (a thread) for detecting the change. Note that, although the details will become apparent from the description provided below, when the reception of the RequestEvent 310 is for the second time or later, the controller 101 performs processing for increasing the no-response count by 1, because the processing for detecting the change in the status has already been started. Also, when detecting a change in the status and notifying the smart device 200 of the details of the change, the controller 101 performs processing for subtracting 1 from the no-response count. In other words, whenever the no-response count is 1 or more, the controller 101 performs the notification processing when detecting a change in the status. In this way, by holding the no-response count, the digital camera 100 can manage suspended responses. Similarly, the smart device 200 can manage suspended response by holding the number of requests for which no response has been received.

Next, in step S404, the controller 201 transmits a request corresponding to the RequestProductInfo 301 to the digital camera 100 via the communication unit 211. In step S405, when detecting that the request has been received via the communication unit 111, the controller 101 composes a response data set by acquiring the product name, the manufacturer name, the firmware version, and the serial number from the non-volatile memory 103. Then, the controller 101 transmits the data set thus composed to the smart device 200 via the communication unit 111.

Next, in step S406, the controller 201 transmits a request corresponding to the RequestMemoryInfo 302 to the digital camera 100 via the communication unit 211. In step S407, when detecting that the request has been received via the communication unit 111, the controller 101 composes a response data set by acquiring the storage area ID, the storage capacity, the free space, and the stored content file count from the work memory 104, the recording medium 110, and so on. Then, the controller 101 transmits the data set thus composed to the smart device 200 via the communication unit 111.

Next, in step S408, the controller 201 acquires the basic information of the digital camera 100, and displays a screen 5A shown in FIG. 5 on the display unit 206. The screen 5A is provided with function buttons 501 to 503 for "browse images in the camera", "perform remote image capturing", and "configure camera settings", etc., and selection is made from among these functions according to a user instruction, which is input via the operation unit 205, so that the selected function is achieved. The screen 5A also shows that at this point in time the remaining battery capacity of the digital camera 100 is 75% and the free space of the recording medium 110 is 1.5 GB. The following describes the sequence in the case where the button 501 for "browse images in the camera" is selected. It is assumed here that 100 image files are already stored in the recording medium 110 of the digital camera 100.

It is also assumed that next in step S409 the button 501 for "browse images in the camera" is selected according to a user operation via the operation unit 205. In this case, in step S409, the controller 201 transmits a request corresponding to the RequestContentInfo 303 with the designation of the storage area ID, the content format type, and the requested content file count, to the digital camera 100 via the communication unit 211. In the present embodiment, the ID indicating the recording medium 110 is set to the storage area ID, and the image type (JPEG, MOV, MP4, or the like) is set to the content format type. Also, 100 (files) as an argument, which is the stored content file count acquired by the request corresponding to the RequestMemoryInfo 302, is set to the requested content file count. Note that the total number of the images stored in the recording medium 110 or the number of images that the smart device 200 can display at a time on the display unit 206 may be specified as the requested content file count requested by the smart device 200.

In step S410, when detecting that the request has been received via the communication unit 111, the controller 101 checks the argument of the request, and acquires the image information set for each of the specified number of images of the specified image type stored in the storage area specified by the storage area ID. Here, the controller 101 refers to the management information of the images files, which is temporarily stored in the work memory 104, or to the file in the recording medium 110 in which management information of the image files is stored, or to the file entry information of the image files according to the file system of the recording medium 110. Thus, the controller 101 acquires the image IDs, image file names, image file sizes, and file generation dates of the image files. Then, the controller 101 temporarily stores these pieces of information to the work memory 104. Also, after storing the image information sets of 100 image files as specified by the requested content file count to the work memory 104 in the form of a list, the controller 101 refers to the generation dates of the image files, and sorts the image information sets temporarily stored in the work memory 104 in the descending order of the generation dates of the image files, i.e., in the order from the newest to the oldest. Then, the controller 101 composes a response data set representing the image information list of the image files temporarily stored in the work memory 104, and transmits the data set thus composed to the smart device 200 via the communication unit 111.

The controller 201 refers to the image information list acquired in response to step S411, and transmits a request corresponding to the RequestContent 304. At this stage, the controller 201 specifies an image ID in the image information list as the content ID, and the parameter for acquiring a thumbnail image as the content size, which serve as arguments.

When detecting that this request has been received via the communication unit 111, the controller 101 refers to the arguments, and acquires the image file corresponding to the specified image ID from the recording medium 110. When the specified size is included in the image file, the controller 101 retrieves only this portion and stores it to the work memory 104, and when there is no such a portion, the controller 101 creates an image file having the specified image size by processing, and stores the image file in the work memory 104. Then, the controller 101 composes a response data set from the image file thus stored, and transmits it to the smart device 200 via the communication unit 111.

Note that the smart device 200 repeats the above-described processing 100 times, which corresponds to the number of images, and thus acquires every thumbnail image to be displayed. At this stage, by transmitting the request corresponding to the RequestContent 304 according to the order of the image information sets in the image information list, the smart device 200 can acquire the image files in the descending order of generation date, without sorting the image files in the desired order within the smart device 200. Although the thumbnails of all the image files stored in the recording medium 110 are acquired in the present embodiment, the above-described processing may be repeated for the number of times that corresponds to the number of thumbnails that the smart device 200 can display at a time on the display unit 206. If this is the case, when an instruction to display the next screen is input, the processing for acquiring the thumbnail images to be displayed subsequently to the above-described processing is to be performed.

Next, upon acquiring the thumbnail images from the digital camera 100, the controller 201 arranges and displays the images (thumbnails) on the display unit 206, as in a screen 5B shown in FIG. 5. Note that 503 indicates information showing the status of the digital camera 100, and 504 is a display area for displaying the thumbnails of the image files. Thus, the content list is displayed.

Upon detecting in step S411 an instruction to display the top screen, the controller 201 displays in step S412 the screen 5A shown in FIG. 5 on the display unit 206.

Upon detecting in step S413 an instruction by a user operation to start the remote image capturing mode, the controller 201 transmits in step S414 a request corresponding to the StartCaptureMode 305 to the digital camera 100. Upon detecting in step S415 that this request has been received via the communication unit 111, the controller 101 causes the digital camera 100 to transition to the state in which the digital camera 100 can perform image capturing. Specifically, the controller 101 controls, for example, the imaging unit 102 including the optical lens unit and the imaging device, so as to start capturing of so-called live view images. Depending on the settings of the digital camera 100, exposure control may be performed at this stage. When the processing is normally completed, the controller 101 composes a response data set from the results, and transmits it to the smart device 200 via the communication unit 1.

In step S416, the controller 201 transmits a request corresponding to the RequestCaptureValue 306 to the digital camera 100. It is assumed here that the controller 101 detects in step S417 that this request has been received via the communication unit 111. If this is the case, the controller 101 composes a response data set from the battery status, number of images that can be captured, zooming position, and image capturing parameters (Av value, Tv value, ISO value, etc.) of the digital camera 100. Note that these pieces information to be included in the response data set are merely examples, and other various sorts of information of the digital camera 100 may be included as needed. The controller 101 transmits the response data set thus composed to the smart device 200 via the communication unit 111.

In step S418, the controller 201 transmits a request corresponding to the RequestEvent 310 to the digital camera 100. In other words, the controller 201 transmits a request corresponding to the RequestEvent 310 to the digital camera 100 regardless of whether or not a response has been made to the request corresponding to the RequestEvent 310 made in step S403. This is to prepare for a change in the information about the settings for image capturing in the remote image capturing mode (number of images that can be captured, zooming position, image capturing parameters (Av value, Tv value, ISO value, etc.)). The request corresponding to the RequestEvent 310 is transmitted in step S418 separately from the request corresponding to the RequestEvent 310 made in step S403 for the following reason. In the present embodiment, when a response is made to a request corresponding to the RequestEvent 310 as described below, the controller 201 transmits a request corresponding to the RequestEvent 310 again and establishes a wait status (suspension session) for waiting for a response to the event. However, it takes a certain amount of time to establish a suspension session again after once responding to the request corresponding to the RequestEvent 310. For this reason, when there is only one suspension session and a change occurs in the information relating to the image capturing settings immediately after a notification of the battery status has been made, a notification of the information relating to the image capturing settings cannot be made until a suspension session is established again. Therefore, in the present embodiment, in the case of the remote image capturing mode, the controller 201 transmits another request corresponding to the RequestEvent 310 besides the request corresponding to the RequestEvent 310 made in step S403, in order to maintain two suspension sessions, and make it possible to acquire information relating to the image capturing settings in real time. When detecting that this request has been received via the communication unit 211, the controller 101 increases the no-response count by "1", because this request is made for the second time.

In step S419, the controller 201 displays a screen 5C shown in FIG. 5 on the display unit 206. This screen 5C has an area for displaying the captured image, and also has items indicated by signs 505 to 508, which are described below. The sign 505 indicates a UI for showing the remaining battery capacity of the digital camera 100. The sign 506 indicates a UI for showing the remaining number of images that can be captured, which indicates the number of images that can be captured in this mode. The sign 507 indicates a release switch. The sign 508 indicates a UI for changing the image capturing settings.

In step S420, the controller 201 transmits a request corresponding to the RequestThroughContent 307 to the digital camera 100. It is assumed here that the controller 101 detects in step S421 that this request has been received via the communication unit 111. If this is the case, the controller 101 composes a response data set by generating a through-the-lens image (an image having a lower resolution than the original resolution provided by the imaging unit 102) from current video data acquired from the imaging unit 102. Then, the controller 101 transmits the data set thus composed to the smart device 200 via the communication unit 111. Steps S420 and S421 will be repeatedly performed until the remote image capturing mode ends. As a result, as shown in the screen 5C, the display unit 206 of the smart device 200 continues displaying through-the-lens images, which are substantially real-time images that are being captured by the imaging unit 102 of the digital camera 100.

In step S422, upon detecting that the user operates the release switch 507, the controller 201 transmits a request corresponding to the ExecuteCapture 308 to the digital camera 100. It is assumed here that the controller 101 detects in step S423 that this request has been received via the communication unit 111. If this is the case, the controller 101 controls the imaging unit 102 and performs image capturing. Then, the controller 101 encodes the image obtained by image capturing to generate an image file (an image file having the original resolution provided by the imaging unit 102 or an equivalently high resolution), and stores the image file to the recording medium 110. After completing the processing for storing, the controller 101 generates a response data set in step S424 from the content ID, content file name, content file size, and file generation date of the content file. Then, the controller 101 transmits the data set thus composed to the smart device 200 via the communication unit 111.

In step S425, the controller 101 returns a response to the request made in step S403, in order to notify that the status of the digital camera 100 has been changed due to a change in the number of images that can be captured caused by image capturing having been performed. If this is the case, the controller 101 composes a response data set from the remaining number of images that can be captured, and transmits it to the smart device 200 via the communication unit 111. This means that a response has been made to the request corresponding to the RequestEvent 310, and accordingly the controller 101 subtracts "1" from the no-response count. At this stage, the no-response count, namely the number of suspension sessions, is changed to 1. Note that it is not only the number of images that can be captured that can be notified in the remote image capturing mode. For example, when a change occurs in the zooming position, the image capturing parameters, etc. transmitted in step S417, the value after the change may be transmitted as a response to the request made in step S403.

In step S426, the controller 201 updates the display area 506 of the screen 5C shown in FIG. 5. In step S427, the controller 201 transmits a request corresponding to the RequestEvent 310 to the digital camera 100. This request is made to execute a plurality of status monitoring sessions, because one of the processes of the API for notification of the status of the digital camera 100 has been completed. At this stage, the no-response count, namely the number of suspension sessions, is changed back to 2.

Upon detecting in step S428 an instruction by a user operation to end the remote image capturing mode, the controller 201 transmits in step S429 a request corresponding to the EndCaptureMode 309 to the digital camera 100. Upon detecting in step S430 that this request has been received via the communication unit 111, the controller 101 ends the image capturing mode, for example by retracting the lens barrel. When the processing is normally completed, the controller 101 composes a response data set from the results, and transmits it to the smart device 200 via the communication unit 111.

In step S431, the controller 101 transmits a response to the request corresponding to the RequestEvent 310 in the remote image capturing mode. This is for ending unnecessary request processing that consumes resources, in response to that the remote image capturing mode has ended. The content of this response is empty or a value indicating "end", which has been input in advance. Referring to the content of this response, the controller 201 avoids transmitting a request corresponding to the RequestEvent 310 again. At this stage, the no-response count, namely the number of suspension sessions, is changed to 1, and this one remaining suspension session is used for notification of the battery status, etc.

In step S432, the controller 201 displays the screen 5A on the display unit 206. Next, upon detecting in step S433 that the battery status of the digital camera 100 has changed, the controller 101, in step S434, composes a response data set from the remaining battery capacity and transmits it to the smart device 200 via the communication unit 111. Then, the controller 101 subtracts "1" from the no-response count. At this stage, the no-response count, namely the number of suspension sessions, is changed to 0. Note that information that can be notified in step S432 is not limited to the information about the battery. For example, information indicating that the digital camera 100 transitions to the power save mode may be transmitted. Also, information indicating that the digital camera 100 disconnects communication with the smart device 200 in response to an operation by the user of the digital camera 100 or timeout may be transmitted.

In step S435, the controller 201 updates the battery information, denoted as the information 503, displayed on the screen 5A in FIG. 5. Incidentally, when the battery information is updated while in the remote image capturing mode, the UI indicated by the sign 505 will be updated.

In step S436, the controller 201 transmits a request corresponding to the RequestEvent 310 to the digital camera 100. This is for acquiring the status information of the digital camera 100 again. At this stage, the no-response count, namely the number of suspension sessions, is changed to 1.

Upon detecting in step S437 a user instruction to end the program, the controller 201 ends communication with the digital camera 100 in step S438.

Upon detecting in step S439 the end of communication via the communication unit 111, the controller 101 transmits a response to the request corresponding to the RequestEvent 310. The content of this response is empty or a value indicating "end", which has been input in advance.

In step S440, the processing for disconnecting the communication between the digital camera 100 and the smart device 200 is completed.

This concludes the description of an example of the method by which the smart device 200 acquires the status information of the digital camera 100 when connecting to the digital camera 100 and acquiring content files by displaying the content file list or performing remote image capturing.

Flowchart for Processing by Digital Camera 100

Next, a description is given of the processing performed by the digital camera 100. FIG. 6A is a flowchart showing API service processing performed by the digital camera 100.

First, in step S601, the controller 101 establishes a wireless local area network (LAN) connection between the digital camera 100 and the smart device 200. The description of this step has been omitted because this step is the same as the above-described step S401 performed by the digital camera 100.

Next, in step S602, the controller 101 performs discovery processing, and consequently, the digital camera 100 and the smart device 200 recognize each other's presence and services provided, and prepare for performing communication via the wireless LAN, using the APIs provided by the digital camera 100. The description of this step has been omitted because this step is the same as the above-described step S402 performed by the digital camera 100.

Next, in step S603, the controller 101 determines whether or not an API request has been received via the communication unit 111. If it is detected that an API request has been received, the process advances to step S604. Otherwise, step S603 is repeatedly performed.

Next, in step S604, the controller 101 detects whether or not the received API request is a request for notification of a change in the status of the digital camera 100, such as a request corresponding to the RequestEvent 310. If YES, the process advances to step S605. Otherwise, the process advances to step S606.

Next, in step S605, the controller 101 starts processing for monitoring the status of the digital camera 100, and sets 1 as the initial value of the no-response count. However, in the case of receiving a request corresponding to the RequestEvent 310 again, the controller 101 performs processing for increasing the no-response count by "1", because the status monitoring processing has already been started.

Steps S6051 to S6055 shown in FIG. 6B constitute the processing performed after the status monitoring processing has been started in step S605. In S6051, the controller 101 detects whether or not the status of the digital camera 100 has been changed. If YES, the process advances to step S6052. Otherwise, the process advances to step S6054. In step S6052, the controller 101 acquires information about the change in the status of the digital camera 100. Then, in step S6053, the controller 101 composes a response data set representing the information about the change, and transmits it to the smart device 200 via the communication unit 111. This means that one response has been made, and accordingly the controller 101 subtracts "1" from the no-response count. When the no-response count is "0", no response is made in this step. However, since the smart device 200 makes a request corresponding to the RequestEvent 310 to the digital camera 100 every time the smart device 200 receives a response relating to the status change, the processing shown in FIG. 6B basically continues.

In step S6054, the controller 101 detects whether or not the digital camera 100 is in the remote image capturing mode. If YES, the process returns to step S6051. Otherwise, the process advances to step S6055. In step S6055, the controller 101 transmits a response to the request corresponding to the RequestEvent 310 for the remote image capturing mode. The description of this step has been omitted because this step is the same as step S431.

The following is a continuation of the description of FIG. 6A. In S606, the controller 101 performs the function of the corresponding API out of the APIs. Next, in step S607, the controller 101 composes a response in a predetermined data format from the information of the digital camera 100 acquired in step S606, and transmits it to the smart device 200.

Next, in step S608, the controller 101 determines whether an instruction to end the API service has been received. Upon detecting the instruction to end the API service, the controller 101 ends the program for executing the API service. Otherwise, the process returns to step S603, and the controller 101 waits for the next API request to be received. Next, upon detecting in step S609 the end of communication via the communication unit 111, the controller 101 transmits a response to the request corresponding to the RequestEvent 310. This step is the same as step S439.

This concludes the description of the flowchart showing API service processing performed by the digital camera 100.

Flowchart for Processing by Smart Device 200

Next, a description is given of the processing performed by the smart device 200 to acquire the status information of the digital camera 100 when acquiring content files by displaying the content file list or performing remote image capturing.

FIG. 7A is a flowchart showing processing performed by an application program executed by the smart device 200.

First, in step S701, the controller 201 establishes a wireless local area network (LAN) connection between the digital camera 100 and the smart device 200. The description of this step has been omitted because this step is the same as the above-described step S401, even though it is performed by the smart device 200 here.

Next, in step S702, the controller 201 performs discovery processing, and consequently, the digital camera 100 and the smart device 200 recognize each other's presence and services provided, and prepare for performing communication via the wireless LAN, using the APIs provided by the digital camera 100. The description of this step has been omitted because this step is the same as the above-described step S402, even though it is performed by the smart device 200 here.

Next, in step S703, the controller 201 transmits a request corresponding to the RequestEvent 310 to the digital camera 100. The description of this step has been omitted because this step is the same as the above-described step S403.

Steps S725 to S728 shown in FIG. 7C constitute the processing performed after the status monitoring processing has been started in step S703. In step S725, the controller 201 detects whether or not a response has been received. If YES, the process advances to step S726. Otherwise, step S726 is repeatedly performed until a response is received. In step S726, the controller 201 analyzes the received response data set, and acquires the status change information of the digital camera 100. In step S727, the controller 201 updates the screen that is being displayed. The description of this step has been omitted because this step is the same as steps S426 and S435. In step S728, the controller 201 transmits a request corresponding to the RequestEvent 310 to the digital camera 100. As a result, the controller 201 can continue status change monitoring, because when receiving a response relating to the status change, the controller 201 is guaranteed to receive a notification of the next occurrence of the status change. The description of this step has been omitted because this step is the same as steps S427 and S436 shown in FIG. 4.

Next, in step S704, the controller 201 transmits a request corresponding to the RequestProductInfo 301 to the digital camera 100. The description of this step has been omitted because this step is the same as the above-described step S410. Next, in step S705, the controller 201 waits for a response to the API request.

The details of the processing of waiting for a response is shown in the flowchart in FIG. 7B. First, in step S721, the controller 201 detects whether or not an API response has been received. If a response has been received, the process advances to step S722. Otherwise, the process advances to step S723. In step S722, the controller 201 analyzes the received response. The received response is stored to the work memory 204 as needed, and is used as a material for determination, or an item to be displayed on a UI screen. If error information is returned as a response, the controller 201 makes the API request again, or ends the program. In step S723, the controller 201 detects whether or not a predetermined time period has elapsed. The program for the smart device 200 has been set in advance so as to wait for a response for a predetermined time period, and when the predetermined time period has elapsed without a response from the digital camera 100, the process advances to step S724. Otherwise, the process returns to step S721, and the controller 201 waits for a response. Note that steps S721 to S724 shown in FIG. 7B are applied to the action of waiting for an API response, in the same manner with respect to all of the API responses.

Next, in step S706, the controller 201 transmits a request corresponding to the RequestMemoryInfo 302 to the digital camera 100. The description of this step has been omitted because this step is the same as the above-described step S410. Next, in step S707, the controller 201 waits for a response to the API request. This step is the same as the above-described step S705.

Next, in step S708, the controller 201 displays the screen 5A shown in FIG. 5 on the display unit 206. The description of this step has been omitted because this step is the same as the above-described step S411. Next, in step S709, the controller 201 detects whether or not an instruction by a user operation to end the program has been made. If YES, the process ends. Otherwise, the process advances to step S710. Next, in step S710, the controller 201 detects whether or not an instruction by a user operation to select the remote image capturing mode has been made. If YES, the process advances to step S711. Otherwise, the controller 201 waits until the remote image capturing mode is selected.

Next, in step S711, the controller 201 transmits a request corresponding to the StartCaptureValue 305 to the digital camera 100. The description of this step has been omitted because this step is the same as the above-described step S414. Next, in step S712, the controller 201 waits for a response to the API request. This step is the same as step S705. Next, in step S713, the controller 201 transmits a request corresponding to the RequestEvent 310 to the digital camera 100. The description of this step has been omitted because this step is the same as the above-described step S418.

Next, in step S714, the controller 201 transmits a request corresponding to the RequestThroughContent 307 to the digital camera 100. The description of this step has been omitted because this step is the same as the above-described step S420. Next, in step S715, the controller 201 performs steps S422 to S427. Next, in step S716, the controller 201 detects whether or not an instruction by a user operation to end the remote image capturing mode has been made. If YES, the process advances to step S717. Otherwise, the controller 201 continues performing remote image capturing.

Next, in step S717, the controller 201 transmits a request corresponding to the EndCaptureMode 309 to the digital camera 100. The description of this step has been omitted because this step is the same as the above-described step S429. Next, in step S718, the controller 201 waits for a response to the API request. This step is the same as step S705. After this step, the process returns to step S708, and the screen 5A shown in FIG. 5 as the top screen is displayed on the display unit 206.

This concludes the description of the processing performed by the smart device 200 to acquire the status information of the digital camera 100 when acquiring content files by displaying the content file list or performing remote image capturing.

As described above, when the digital camera 100 according to the first embodiment receives a request corresponding to the RequestEvent 310 from an external device (the smart device 200 in the case of the embodiment), the digital camera 100 does not immediately make a response, but instead adds a suspension session corresponding to the response in case a status change actually occurs (in the embodiment, no-response count is increased for this purpose). When a status change occurs, the digital camera 100 makes a response to the requestor based on the content of the status change, and finishes the suspension session. As a result, using a small number of sessions, the external device can continuously monitor a status change in the digital camera 100 as a whole and a status change specific to the remote camera by issuing a request corresponding to the RequestEvent 310 according to the above-described procedures. In other words, it is no longer necessary to prepare a large number of sessions in order to always be ready to receive a status notification.

Second Embodiment

In the description of the first embodiment above, it is assumed that only one type of API is prepared for acquiring the status of the digital camera 100. However, it is possible that various types of APIs are prepared according to their purposes. Hence in the second embodiment, a description is given of the case where an API for acquiring the status is prepared for each of the operation modes of the digital camera 100.

Configuration of APIs for Controlling Digital Camera from External Device

FIG. 8 is a diagram illustrating other sorts of RequestEvent APIs according to the second embodiment, from among the APIs for controlling the digital camera 100 from an external device, included in the API list 300.

An API 801 is an API for acquiring pieces of status information of the digital camera 100 changed in all modes including the content list display mode and the remote image capturing mode. When receiving a request having the API name "RequestCameraEvent" with no argument, the digital camera 100 acquires part or all of the information that can be acquired by the API 801. Note that the digital camera 100 does not immediately return a response to the request corresponding to the API 801. The digital camera 100 waits until a change occurs in a part of the status information, and when detecting a change, the digital camera 100 returns, as a response, only the piece of information that has been changed. In the present embodiment, for example, the API 801 is an API for acquiring the battery information.

An API 802 is an API for acquiring a piece of status information that has been changed from among pieces of status information of the digital camera 100 when it is a piece of information that is used only in the remote image capturing mode. When receiving a request having the API name "RequestCaptureEvent" with no argument, the digital camera 100 acquires part or all of the information that can be acquired by the API 801. Note that the digital camera 100 does not immediately return a response to the request corresponding to this API. The digital camera 100 waits until a change occurs in part of the status information, and when detecting a change, the digital camera 100 returns, as a response, only the piece of information that has been changed. In the present embodiment, the piece of information is about the remaining number of images that can be captured and the image capturing parameters.

Note that when receiving a request corresponding to the API 801 or a request corresponding to the API 802, the digital camera 100 starts processing related to status detection and processing related to response making, which are provided for each request. However, it is possible that only one process is provided for status detection, and if this is the case, a flag indicating whether or not a request corresponding to the API 801 or 802 has been made is provided, and when the flag is "1", a determination may be made as to whether or not a change has occurred in the corresponding status information, and the process for making a response is performed when a change is detected, for example. The APIs described above are merely examples, and other various methods for controlling the digital camera 100 may be provided.

Communication Sequence in which Smart Device Acquires Status Information of Digital Camera With reference to FIG. 9 and FIG. 5, the following describes the method by which the smart device 200 acquires the status information of the digital camera 100 when connecting to the digital camera 100 and acquiring content files by displaying the content file list or performing remote image capturing.

The basic sequence is the same as the sequence described for FIG. 4. The following describes only the differences. Steps S901 to S940 and steps S401 to S440 correspond to each other. Among these steps, steps S903, S918, S925, S927, S931, S934, S936, and S939 are slightly different. The following describes these different steps.

In step S903, which is an early stage after the establishment of communication, the controller 201 of the smart device 200 transmits a request corresponding to the RequestCameraEvent 801 to the digital camera 100 via the communication unit 211. Upon detecting that this request has been received via the communication unit 111, the controller 101 of the digital camera 100 performs the processing for detecting the occurrence of a change in the status of the digital camera 100. A response to this API request is transmitted when the battery information is updated.

In step S918, the controller 201 transmits a request corresponding to the RequestCaptureEvent 802 to the digital camera 100. A response to this API request is transmitted when the information relating to the image capturing settings in the remote image capturing mode (number of images that can be captured, zooming position, image capturing parameters (Av value, Tv value, ISO value, etc.)) is changed. Upon detecting that this request has been received via the communication unit 111, the controller 101 performs the processing for detecting the occurrence of a change in the status of the digital camera 100.

In step S925, the controller 101 returns a response to the request made in step S918, in order to notify that the status of the digital camera 100 has changed. In this case, as image capturing has been performed and the remaining number of images that can be captured has changed, the controller 101 composes a response data set from the remaining number of images that can be captured, and transmits it to the smart device 200 via the communication unit 111.

In step S927, the controller 201 transmits a request corresponding to the RequestCaptureEvent 802 to the digital camera 100. This request is made to perform status monitoring again, because one of the information notification processes relating to the image capturing settings of the digital camera 100 has been completed.

In step S931, the controller 101 transmits a response to the request corresponding to the RequestCaptureEvent 802 in the remote image capturing mode. This is for ending unnecessary request processing, in response to the ending of the remote image capturing mode.

Upon detecting in step S934 that the battery status of the digital camera 100 has been changed, the controller 101 composes a response data set from battery information, as a response to the request corresponding to the RequestCameraEvent 801 made in step S903, and transmits it to the smart device 200 via the communication unit 111.

In step S936, the controller 201 transmits a response to the request corresponding to the RequestCameraEvent 801 in the remote image capturing mode. This is for acquiring the status information of the digital camera 100 again. Upon detecting in step S939 the end of communication via the communication unit 111, the controller 101 transmits a response to the request corresponding to the RequestCameraEvent 801.

This concludes the description of an example of the method according to the second embodiment by which the smart device 200 connects to the digital camera 100 and acquires content files.

Note that in the second embodiment, it is assumed that there are two types of APIs for acquiring the status, namely "RequestCameraEvent" and "RequestCaptureEvent". It is assumed that "RequestCameraEvent" is common to all of the modes, and "RequestCaptureEvent" is specific to the acquisition of a change in the status with respect to the image capturing settings of the digital camera 100. If there is a mode other than the above-described modes as an operation mode of the digital camera 100, an API may be newly provided for acquiring the status change information specific to the mode. However, in the case of battery-powered apparatuses like the digital camera 100, a change in the remaining battery capacity has an influence on all of the modes, and it is therefore desirable that a status change information acquiring API that is common to all of the modes is provided as described above.

According to the above-described second embodiment, by making a reservation for only one status change notification for each operation mode of the digital camera 100, the external device is guaranteed to receive a response providing a status change notification in each mode.

Other Embodiments

Each of the embodiments above describes an example case in which the digital camera 100 is configured to, when receiving a request corresponding to the RequestEvent 310, the RequestCameraEvent 801, or the RequestCaptureEvent 802 for example, transmit a response composed from the information of a single change in the status, triggered by the detection of the single change in the status. However, the digital camera 100 may be configured to transmit a response made up of the information of a plurality of changes in the status when detecting the plurality of changes at the same timing.

For example, when the battery status has changed immediately before step S425, a response composed from two pieces of information, namely the number of images that can be captured and the remaining battery capacity, may be transmitted as a response in step S425.

Also, in the above-described embodiments, the responses to the request corresponding to the RequestEvent 310 and the request corresponding to the RequestCaptureEvent 802, which are requests for the remote image capturing mode, are transmitted immediately when the status change of the digital camera 100 is detected relating to remote image capturing. However, regarding the image capturing settings, there are setting values that are automatically changed under the influence of a change in one setting value. For example, due to the constraints of the image capturing sensor of the digital camera 100, if the shutter speed is reduced by changing the Tv value, the range of the settable ISO value will be limited, and the ISO value will be automatically changed. When the Av value is changed in the remote image capturing mode, a response made up of information about the change in the Av value and the ISO value may be transmitted after the setting change processing for both the Av value and the ISO value has been completed. Also, although the content list display mode and the remote image capturing mode are described as examples of the modes of the digital camera 100 and the smart device 200 in the embodiments above, the present invention may be applied to other modes. For example, in the remote image capturing mode, if the mode is moving image capturing mode, it is necessary to perform audio recording. Therefore, a request corresponding to RequestEvent for notifying the status relating to audio recording may be additionally transmitted. Also, when image capturing is performed with use of accessories such as an external flash, a GPS unit, and a communication card, a request corresponding to RequestEvent for notifying the statuses of the accessories may be additionally transmitted.

With the embodiments above, it is possible to know at least a change in the status of the image capturing apparatus as a whole and a change in the status when the camera serves as a remote camera, by using a smaller number of sessions.

Although the present invention has been described above based on the preferred embodiments thereof, the present invention is not intended to be limited to these specific embodiments, and various variations that do not depart from the essential spirit of the invention are intended to be included in the scope of the present invention. Some of the above-described embodiments may be combined as appropriate. The case where a software program that realizes the functions of the above-described embodiments is supplied to a system or an apparatus having a computer capable of executing a program directly from a recording medium or using wired/wireless communication and this program is executed is a case that is also included in the present invention. Accordingly, in order to realize the functional processing of the present invention with a computer, the present invention is realized by the program code itself, which is supplied to the computer and installed thereon. In other words, the computer program for realizing the functional processing of the present invention is itself included in the present invention. In this case, as long as the functions of a program are realized, any configuration of a program is possible, such as that of a program that is executed by an interpreter, script data that is supplied to an OS, or the like. A recording medium for supplying the program may be, for example, a hard disk, a magnetic recording medium such as magnetic tape, an optical/photomagnetic storage medium, or a non-volatile semiconductor memory. Conceivable methods of supplying the program include a computer program for forming the present invention being stored in a server on a computer network, and a client computer connected to the computer network downloading and executing the computer program.

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-179522, filed Sep. 3, 2014, and 2015-166187, filed Aug. 25, 2015, which are hereby incorporated by reference herein in their entirety.

The invention claimed is:

1. A communication apparatus, comprising:
a processor; and
a memory storing a program to be executed by the processor, wherein, when read and executed by the processor, the program causes the communication apparatus to perform as:
a reception unit configured to receive a request from an information processing apparatus;
a transmission unit configured to transmit a response to the request; and
a managing unit configured to, when a predetermined request from the information processing apparatus is received, manage the predetermined request as a suspended request, instead of immediately responding to the predetermined request;
wherein when a status of the communication apparatus fulfills a predetermined condition, the transmission unit transmits status information of the communication apparatus, which serves as a response to the suspended request,
wherein, when the reception unit receives another new predetermined request before the transmission unit transmits the response to the suspended request, the managing unit manages the another predetermined request as a new suspended request, whereby the managing unit manages a plurality of suspended requests.

2. The communication apparatus according to claim 1, wherein a number of suspended requests that can be managed by the managing unit varies depending on a mode of the communication apparatus.

3. The communication apparatus according to claim 1, wherein the program, when read and executed by the processor, further causes the communication apparatus to perform as a transition unit configured to cause a transition to any one mode out of modes that include a first mode and a second mode,
wherein a number of suspended requests to be managed in the second mode is greater than a number of suspended requests to be managed in the first mode.

4. The communication apparatus according to claim 3, wherein the program, when read and executed by the processor, further causes the communication apparatus to perform as an imaging unit,
wherein the first mode is a mode in which image data recorded in a recording medium of the communication apparatus is transmitted to the information processing apparatus, and the second mode is a mode in which image capturing performed by the imaging unit is controlled from the information processing apparatus.

5. The communication apparatus according to claim 4, wherein the status information of the communication apparatus transmitted in the second mode includes information about a number of images that can be captured.

6. The communication apparatus according to claim 4, wherein the status information of the communication apparatus transmitted in the second mode includes information indicating image capturing parameters of the communication apparatus.

7. The communication apparatus according to claim 3, wherein the managing unit, when managing suspended requests, distinguishes between a suspended request that is based on a predetermined request received in the first mode and a suspended request that is based on a predetermined request received in the second mode.

8. The communication apparatus according to claim 3, wherein the status included in the status information of the communication apparatus transmitted in the first mode and the status included in the status information of the communication apparatus transmitted in the second mode are different from each other.

9. The communication apparatus according to claim 1, wherein, upon transmission, by the transmission unit, of the status information of the communication apparatus, which serves as a response to the suspended request, the reception unit receives a new predetermined request from the information processing apparatus, and the managing unit manages the new predetermined request as a new suspended request.

10. The communication apparatus according to claim 1, wherein, when the transmission unit transmits a predetermined response to the suspended request, the reception unit does not receive a new predetermined request from the information processing apparatus.

11. The communication apparatus according to claim 1, wherein the status information of the communication apparatus includes battery information of the communication apparatus.

12. The communication apparatus according to claim 1, wherein the status information of the communication apparatus includes information indicating that the communication apparatus is to transition to a power save mode.

13. The communication apparatus according to claim 1, wherein the status information of the communication apparatus includes information indicating that the communication apparatus ends communication with the information processing apparatus.

14. An information processing apparatus, comprising:
a transmission unit configured to transmit a request to a communication apparatus; and
a reception unit configured to receive from the communication apparatus a response to the request;
wherein the transmission unit transmits a predetermined request to the communication apparatus, wherein a response to the predetermined request is suspended by the communication apparatus and is used for transmitting status information of the communication apparatus from the communication apparatus to the information processing apparatus, and wherein the transmission unit is configured to transmit a new predetermined request before reception of a response to a predetermined request that has already been transmitted.

15. The information processing apparatus according to claim 14, wherein a number of suspended responses varies depending on a mode of the information processing apparatus.

16. The information processing apparatus according to claim 14, further comprising a transition unit configured to cause a transition to any one mode out of modes that include a first mode and a second mode, wherein a number of responses to be suspended in the second mode is greater than a number of responses to be suspended in the first mode.

17. The information processing apparatus according to claim 16, further comprising an imaging unit, wherein the first mode is a mode in which image data recorded in a recording medium of the communication apparatus is received, and the second mode is a mode in which image capturing performed by the imaging unit is controlled from the information processing apparatus.

18. The information processing apparatus according to claim 17, wherein the status information transmitted in the second mode includes information about a number of images that can be captured by the communication apparatus.

19. The information processing apparatus according to claim 17, wherein the status information transmitted in the second mode includes information indicating image capturing parameters of the communication apparatus.

20. The information processing apparatus according to claim 16, wherein, when a transition to the second mode occurs, the transmission unit transmits a new predetermined request to the communication apparatus.

21. The information processing apparatus according to claim 16, wherein the status included in the status information of the communication apparatus received in the first mode and the status included in the status information of the communication apparatus received in the second mode are different from each other.

22. The information processing apparatus according to claim 14, wherein, upon reception, by the reception unit, of the status information of the communication apparatus, which serves as a response to the predetermined request, the transmission unit transmits a new predetermined request to the communication apparatus.

23. The information processing apparatus according to claim 14, wherein, when the reception unit receives a predetermined response serving as a response to the predetermined request, the transmission unit does not transmit a new predetermined request to the communication apparatus.

24. The information processing apparatus according to claim 14, wherein the status information of the communication apparatus includes battery information of the communication apparatus.

25. The information processing apparatus according to claim 14, wherein the status information of the communication apparatus includes information indicating that the communication apparatus is to transition to a power save mode.

26. The information processing apparatus according to claim 14, wherein the status information of the communication apparatus includes information indicating that the communication apparatus ends communication with the information processing apparatus.

27. A method for controlling a communication apparatus, comprising:

receiving a request from an information processing apparatus;

transmitting a response to the request; and when a predetermined request from the information processing apparatus is received, managing the predetermined request as a suspended request, instead of immediately responding to the predetermined request, wherein, in the transmission, when a status of the communication apparatus fulfills a predetermined condition, status information of the communication apparatus, which serves as a response to the suspended request, is transmitted, wherein, in the managing, when another new predetermined request is received before the transmission of the response to the suspended request, the another new predetermined request is managed as a new suspended request and a plurality of suspended requests is managed.

28. A method for controlling an information processing apparatus, comprising:

transmitting a request to a communication apparatus; and receiving from the communication apparatus a response to the request, wherein, in the transmission, a predetermined request is transmitted to the communication apparatus, wherein a response to the predetermined request is suspended by the communication apparatus and is used for transmitting status information of the communication apparatus from the communication apparatus to the information processing apparatus, and wherein, in the transmission, a new predetermined request can be transmitted before reception of a response to a predetermined request that has already been transmitted.

29. A non-transitory computer-readable storage medium storing a program which, when read and executed by a computer, causes the computer to execute steps of a method for a communication apparatus, the method comprising:

receiving a request from an information processing apparatus;

transmitting a response to the request; and when a predetermined request from the information processing apparatus is received, managing the predetermined request as a suspended request, instead of immediately responding to the predetermined request, wherein, in the transmission, when a status of the communication apparatus fulfills a predetermined condition, status information of the communication apparatus, which serves as a response to the suspended request, is transmitted, wherein, in the managing, when another new predetermined request is received before the transmission of the response to the suspended request, the another new predetermined request is managed as a new suspended request and a plurality of suspended requests is managed.

30. A non-transitory computer-readable storage medium storing a program which, when read and executed by a computer, causes the computer to execute steps of a method for an information processing apparatus, the method comprising:

transmitting a request to a communication apparatus; and receiving from the communication apparatus a response to the request, wherein, in the transmission, a predetermined request is transmitted to the communication apparatus, wherein a response to the predetermined request is suspended by the communication apparatus and is used for transmitting status information of the communication apparatus from the communication apparatus to the information processing apparatus, and wherein, in the transmission, a new predetermined request can be transmitted before reception of a response to a predetermined request that has already been transmitted.

* * * * *